(12) United States Patent
Zhang et al.

(10) Patent No.: US 9,732,887 B2
(45) Date of Patent: Aug. 15, 2017

(54) TRAPEZE HANGER SYSTEM INCLUDING TWIST-LOCKING FITTING

(71) Applicant: Cooper Technologies Company, Houston, IL (US)

(72) Inventors: Zhihui Zhang, Edwardsville, IL (US); Christopher Lee Greenwalt, Dixon, IL (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 15/253,197

(22) Filed: Aug. 31, 2016

(65) Prior Publication Data

US 2016/0369918 A1    Dec. 22, 2016

Related U.S. Application Data

(62) Division of application No. 14/701,111, filed on Apr. 30, 2015, now Pat. No. 9,458,952.

(Continued)

(51) Int. Cl.
*F16B 37/04*      (2006.01)
*F16L 3/24*       (2006.01)
(Continued)

(52) U.S. Cl.
CPC ................. *F16L 3/24* (2013.01); *F16B 7/18* (2013.01); *F16B 7/187* (2013.01); *F16B 37/042* (2013.01);
(Continued)

(58) Field of Classification Search
CPC .. F16B 37/045; F16B 37/046; F16B 37/0885; F16B 37/0892; F16L 3/24; F16L 3/10
See application file for complete search history.

(56) References Cited

U.S. PATENT DOCUMENTS

| 1,813,545 A | 7/1931 | Reinhold |
| 1,934,760 A | 11/1933 | Awbrey |

(Continued)

FOREIGN PATENT DOCUMENTS

| CN | 202416847 U | 9/2012 |
| DE | 7701100 | 5/1977 |

(Continued)

OTHER PUBLICATIONS

Drawing of MQM Wing Nut, (at least as early as Mar. 13, 2012), 1 page.

(Continued)

*Primary Examiner* — Rodney Mintz
*Assistant Examiner* — Daniel Kenny
(74) *Attorney, Agent, or Firm* — Senniger Powers LLP

(57) ABSTRACT

A twist-locking fitting for securing a strut to a rod includes first and second fitting pieces. Each fitting piece includes a half-nut portion having an interior surface defining an axis extending through first and second axial ends of the half-nut portion. Each fitting piece includes an outer flange extending outward from adjacent the first axial end of the half-nut portion and an inner flange extending outward from adjacent the second axial end of the half-nut portion. The inner flange is spaced axially apart from the outer flange to define a clearance gap. The fitting pieces are positionable on the strut in an unsecured position in which the fitting pieces are movable relative to one another. The fitting pieces are rotatable relative to the strut to move from the unsecured position to a secured position, in which the fitting pieces are fixed relative to one another on the strut.

13 Claims, 30 Drawing Sheets

Related U.S. Application Data

(60) Provisional application No. 61/986,608, filed on Apr. 30, 2014.

(51) Int. Cl.
*F16M 13/02* (2006.01)
*F16B 7/18* (2006.01)
*F16L 3/10* (2006.01)
*F16B 37/08* (2006.01)

(52) U.S. Cl.
CPC .......... *F16B 37/0892* (2013.01); *F16L 3/10* (2013.01); *F16M 13/02* (2013.01); *F16M 13/027* (2013.01); *Y10T 29/4995* (2015.01)

(56) References Cited

U.S. PATENT DOCUMENTS

| | | |
|---|---|---|
| 1,963,908 A | 6/1934 | Manasek |
| 2,307,653 A | 1/1943 | Wright |
| 2,375,513 A | 5/1945 | Bach |
| 2,420,826 A * | 5/1947 | Irrgang .................. H02G 3/065 16/108 |
| 2,470,991 A | 5/1949 | Kindorf et al. |
| 2,567,463 A | 9/1951 | Atkinson |
| 2,676,680 A * | 4/1954 | Kindorf .................. E04B 9/183 238/342 |
| 2,767,609 A | 10/1956 | Cousino |
| 2,767,951 A | 10/1956 | Cousino |
| 2,804,180 A | 8/1957 | Richardson |
| 2,846,169 A | 8/1958 | Sullivan |
| 2,944,642 A | 7/1960 | Evans |
| 3,005,292 A | 10/1961 | Reiland |
| 3,226,069 A | 12/1965 | Clarke |
| 3,266,761 A | 8/1966 | Walton et al. |
| 3,310,264 A | 3/1967 | Appleton |
| 3,312,034 A | 4/1967 | Steinmann |
| 3,396,499 A | 8/1968 | Biffani |
| 3,417,951 A | 12/1968 | Rebentisch, Jr. |
| 3,451,183 A | 6/1969 | Lespagnol et al. |
| 3,463,428 A | 8/1969 | Kindorf et al. |
| 3,486,726 A | 12/1969 | Kindorf et al. |
| 3,513,606 A | 5/1970 | Jones |
| 3,527,432 A | 9/1970 | Lytle |
| 3,547,385 A | 12/1970 | Kindorf et al. |
| 3,566,561 A | 3/1971 | Tozer |
| 3,592,493 A | 7/1971 | Goose |
| 3,601,347 A | 8/1971 | Attwood et al. |
| 3,612,461 A | 10/1971 | Brown |
| 3,650,499 A | 3/1972 | Biggane |
| 3,748,808 A | 7/1973 | Sheppard et al. |
| 3,752,198 A | 8/1973 | Fiorentino et al. |
| 3,757,485 A | 9/1973 | Vincens |
| 3,863,300 A | 2/1975 | Becker |
| 3,944,308 A | 3/1976 | Persson |
| 3,986,314 A | 10/1976 | Moeller |
| 3,998,419 A | 12/1976 | Semmerling |
| 4,044,428 A | 8/1977 | Kowalski |
| 4,185,802 A | 1/1980 | Myles et al. |
| 4,211,381 A | 7/1980 | Heard |
| 4,216,930 A | 8/1980 | Rossler, Jr. et al. |
| 4,227,355 A | 10/1980 | Wendt |
| 4,358,216 A | 11/1982 | Pleickhardt et al. |
| 4,379,651 A | 4/1983 | Nagashima |
| 4,397,437 A | 8/1983 | Madej |
| 4,417,711 A | 11/1983 | Madej |
| 4,479,341 A | 10/1984 | Schuplin |
| 4,490,064 A | 12/1984 | Ducharme |
| 4,506,418 A | 3/1985 | Viola et al. |
| 4,516,296 A | 5/1985 | Sherman |
| 4,610,562 A | 9/1986 | Dunn |
| 4,637,748 A | 1/1987 | Beavers |
| 4,657,458 A | 4/1987 | Wollar et al. |
| 4,666,355 A | 5/1987 | Stover |
| 4,708,554 A | 11/1987 | Howard |
| 4,726,165 A | 2/1988 | Brinsa |
| 4,729,532 A | 3/1988 | Moss |
| 4,784,552 A | 11/1988 | Rebentisch |
| 4,830,531 A | 5/1989 | Condit et al. |
| 4,895,412 A | 1/1990 | Deley et al. |
| 4,934,886 A | 6/1990 | Aikens |
| 4,948,313 A | 8/1990 | Zankovich |
| 4,950,099 A | 8/1990 | Roellin |
| 4,961,553 A | 10/1990 | Todd |
| 4,993,670 A | 2/1991 | Tesar |
| 5,014,940 A | 5/1991 | Sherman |
| 5,022,614 A | 6/1991 | Rinderer |
| D322,929 S | 1/1992 | Abbestam et al. |
| 5,078,537 A | 1/1992 | Nomura |
| 5,102,074 A | 4/1992 | Okada |
| 5,116,161 A | 5/1992 | Faisst |
| 5,118,233 A | 6/1992 | Mitchell |
| 5,141,186 A | 8/1992 | Cusic |
| 5,146,724 A | 9/1992 | Angelo |
| 5,163,644 A | 11/1992 | Kowalski |
| 5,175,971 A | 1/1993 | McCombs |
| 5,205,022 A | 4/1993 | Norton |
| 5,215,281 A | 6/1993 | Sherman |
| 5,228,263 A | 7/1993 | Vaughn |
| 5,271,586 A | 12/1993 | Schmidt |
| 5,274,888 A | 1/1994 | Payne |
| 5,335,890 A | 8/1994 | Pryor et al. |
| 5,351,926 A | 10/1994 | Moses |
| 5,375,798 A | 12/1994 | Hungerford, Jr. |
| 5,489,173 A | 2/1996 | Hofle |
| 5,503,511 A | 4/1996 | Flamme |
| 5,566,916 A | 10/1996 | Bailey |
| 5,595,363 A | 1/1997 | De Leebeeck |
| 5,628,508 A | 5/1997 | Koole |
| 5,628,598 A | 5/1997 | Höfle |
| 5,655,816 A | 8/1997 | Magnuson et al. |
| 5,655,865 A | 8/1997 | Plank et al. |
| 5,718,403 A | 2/1998 | Ott et al. |
| 5,729,948 A | 3/1998 | Levy et al. |
| 5,746,535 A | 5/1998 | Kohler |
| 5,779,412 A | 7/1998 | Nagai et al. |
| 5,799,452 A | 9/1998 | Moore |
| 5,799,907 A | 9/1998 | Andronica |
| 5,806,268 A | 9/1998 | Koller |
| 5,806,897 A | 9/1998 | Nagai et al. |
| 5,820,322 A * | 10/1998 | Hermann .............. F16B 37/045 411/174 |
| 5,833,417 A | 11/1998 | Sargent et al. |
| 5,855,342 A | 1/1999 | Hawkins et al. |
| 5,864,997 A | 2/1999 | Kelly |
| 5,918,999 A | 7/1999 | Lamarca |
| 5,924,650 A | 7/1999 | Richichi |
| 5,927,041 A | 7/1999 | Sedlmeier et al. |
| 5,970,679 A | 10/1999 | Amore |
| 5,984,243 A | 11/1999 | Pfaller et al. |
| 5,988,930 A | 11/1999 | Liebetrau et al. |
| 6,061,984 A | 5/2000 | Rose |
| 6,062,764 A | 5/2000 | Rixen et al. |
| 6,106,189 A | 8/2000 | Seale |
| 6,195,953 B1 | 3/2001 | Gitter et al. |
| 6,322,030 B1 | 11/2001 | Marra |
| 6,347,904 B1 | 2/2002 | Knighton |
| 6,454,232 B1 | 9/2002 | Roth |
| 6,484,358 B1 | 11/2002 | Duong et al. |
| 6,494,415 B1 | 12/2002 | Roth |
| 6,561,473 B1 | 5/2003 | Ianello |
| 6,572,057 B1 | 6/2003 | Roth |
| 6,655,099 B1 | 12/2003 | Trenoweth |
| 6,660,938 B2 | 12/2003 | Herb et al. |
| 6,679,461 B1 | 1/2004 | Hawkins |
| 6,682,253 B2 | 1/2004 | Binna et al. |
| 6,712,543 B1 | 3/2004 | Schmalzhofer |
| 6,726,117 B2 * | 4/2004 | Herb ...................... F16B 37/046 238/315 |
| 6,751,914 B2 | 6/2004 | Zeh et al. |
| 6,766,992 B1 | 7/2004 | Parker |
| 6,802,171 B2 | 10/2004 | McKinnon |
| 6,991,198 B1 | 1/2006 | Roth |
| 7,014,213 B1 | 3/2006 | Kaiser |

(56) References Cited

U.S. PATENT DOCUMENTS

| | | | |
|---|---|---|---|
| 7,044,701 B2 | 5/2006 | Herb | |
| 7,070,374 B2 | 7/2006 | Womack et al. | |
| 7,096,641 B2 | 8/2006 | Birnbaum et al. | |
| 7,179,010 B2 | 2/2007 | Weger et al. | |
| 7,240,884 B2 | 7/2007 | Shim | |
| 7,287,733 B2 | 10/2007 | Bongio et al. | |
| 7,389,621 B2 | 6/2008 | Hawes | |
| 7,448,822 B2 | 11/2008 | Nebeker et al. | |
| 7,478,787 B2 | 1/2009 | Bankston et al. | |
| 7,484,697 B1 | 2/2009 | Nelson | |
| 7,600,724 B2 * | 10/2009 | Nelson | F16B 21/02 248/68.1 |
| 7,604,444 B2 | 10/2009 | Wu | |
| 7,661,915 B2 | 2/2010 | Whipple | |
| 7,818,925 B2 | 10/2010 | Benedict | |
| 7,922,130 B2 | 4/2011 | Hawkins | |
| 7,922,417 B2 | 4/2011 | Jimenez | |
| 7,934,896 B2 * | 5/2011 | Schnier | F16B 37/0892 411/432 |
| 7,984,601 B2 | 7/2011 | Bimbaum et al. | |
| 8,100,600 B2 | 1/2012 | Blum | |
| D654,064 S | 2/2012 | Sergi | |
| 8,225,581 B2 | 7/2012 | Strickland et al. | |
| 8,277,158 B2 | 10/2012 | Csik et al. | |
| 8,303,223 B2 | 11/2012 | Rass et al. | |
| 8,341,913 B2 | 1/2013 | Meres et al. | |
| 8,366,340 B2 | 2/2013 | Munakata et al. | |
| 8,454,259 B2 | 6/2013 | Oetlinger | |
| 8,465,242 B2 | 6/2013 | Arendt et al. | |
| 8,511,929 B2 | 8/2013 | Raye et al. | |
| 8,523,923 B2 | 9/2013 | Thomke et al. | |
| 8,567,030 B2 | 10/2013 | Koch et al. | |
| 8,596,009 B2 | 12/2013 | Baxter et al. | |
| 8,661,765 B2 | 3/2014 | Schaefer et al. | |
| 8,662,455 B2 | 3/2014 | Hernandez et al. | |
| 8,695,296 B2 | 4/2014 | Bergman | |
| D728,753 S | 5/2015 | Hikoyama | |
| 9,187,898 B1 | 11/2015 | Underkofler et al. | |
| 9,194,418 B2 | 11/2015 | Parthibhan et al. | |
| 9,249,994 B2 | 2/2016 | Zuritis | |
| 2002/0000498 A1 | 1/2002 | Workman | |
| 2002/0060280 A1 | 5/2002 | Yaphe et al. | |
| 2002/0110435 A1 | 8/2002 | Herb et al. | |
| 2002/0122691 A1 | 9/2002 | Wood | |
| 2003/0042033 A1 | 3/2003 | Herb et al. | |
| 2003/0043033 A1 | 3/2003 | Lee | |
| 2003/0063961 A1 | 4/2003 | Lay | |
| 2003/0122044 A1 | 7/2003 | Unverzagt et al. | |
| 2003/0159397 A1 | 8/2003 | Birnbaum | |
| 2003/0185643 A1 | 10/2003 | Thompson | |
| 2004/0165943 A1 | 8/2004 | Herb | |
| 2004/0165947 A1 | 8/2004 | Herb | |
| 2004/0165965 A1 | 8/2004 | Unverzagt et al. | |
| 2004/0228681 A1 | 11/2004 | Herb | |
| 2005/0116123 A1 | 6/2005 | Bailey et al. | |
| 2005/0129458 A1 | 6/2005 | Hoffmann | |
| 2006/0027715 A1 | 2/2006 | Dinh et al. | |
| 2006/0038398 A1 | 2/2006 | Whipple et al. | |
| 2007/0040075 A1 | 2/2007 | Moretto | |
| 2007/0075213 A1 | 4/2007 | Foser et al. | |
| 2007/0101670 A1 | 5/2007 | Ahren et al. | |
| 2007/0120036 A1 | 5/2007 | Olle et al. | |
| 2007/0145222 A1 | 6/2007 | Rausch | |
| 2007/0248793 A1 | 10/2007 | Herb et al. | |
| 2008/0217490 A1 | 9/2008 | Bucciferro et al. | |
| 2008/0229699 A1 | 9/2008 | Nehls | |
| 2010/0102011 A1 | 4/2010 | Blum | |
| 2010/0193645 A1 | 8/2010 | Merhar et al. | |
| 2012/0110788 A1 | 5/2012 | Chen | |
| 2012/0119037 A1 | 5/2012 | Azuma et al. | |
| 2012/0286110 A1 | 11/2012 | Hill | |
| 2012/0297723 A1 | 11/2012 | Siddiqui et al. | |
| 2012/0315106 A1 | 12/2012 | Amedt et al. | |
| 2013/0047541 A1 | 2/2013 | Mayer | |
| 2014/0042286 A1 | 2/2014 | Jaffari | |
| 2014/0091050 A1 | 4/2014 | Zhang | |
| 2014/0093307 A1 | 4/2014 | Zhang | |
| 2014/0097304 A1 | 4/2014 | Mastro | |
| 2014/0197284 A1 | 7/2014 | Hikoyama | |
| 2014/0283475 A1 | 9/2014 | Zhang et al. | |
| 2015/0276092 A1 | 10/2015 | Oliver et al. | |
| 2015/0322669 A1 | 11/2015 | Shih | |

FOREIGN PATENT DOCUMENTS

| | | |
|---|---|---|
| DE | 8232700 | 6/1983 |
| DE | 3513382 A1 | 10/1986 |
| DE | 8704502 | 7/1987 |
| DE | 102006035405 A1 | 5/2008 |
| DE | 202010004406 U1 | 8/2010 |
| DE | 102009000603 A1 | 9/2010 |
| DE | 20 2012 102 394 U1 | 9/2012 |
| EP | 0 592 743 A1 | 10/1992 |
| GB | 569377 | 5/1945 |
| GB | 687403 | 2/1953 |
| GB | 1157545 | 7/1969 |
| GB | 1370645 | 10/1974 |
| JP | 2000-139583 A | 5/2000 |
| WO | 9837349 | 8/1998 |
| WO | 2013125821 A1 | 8/2013 |
| WO | 2014159372 A1 | 10/2014 |

OTHER PUBLICATIONS

HILTI MI/MZ Technical Guide, 42 MQ System Components—Load Data and Material Specifications, MQM Wing Nut, (at least as early as Mar. 13, 2012), 1 page, www.us.hilti.com, Canada.
B-Line by EATON—Channel Nuts & Hardware, Strut Systems, (at least as early as Mar. 13, 2012), pp. 45-53.
Power-Strut Engineering Catalog, Pictorial Table of Contents, (at least as early as Mar. 13, 2012), pp. 11-14, www.alliedeg.com.
Unistrut, Channels Nuts, Top Retainer Nut, (at least as early as Mar. 13, 2012), 1 page.
Unistrut, P1000® & P1001 Channels, (at least as early as Mar. 13, 2012), 1 page.
Unistrut, P1100® & P1101 Channels, (at least as early as Mar. 13, 2012), 1 page.
Unistrut, P2000® & P2001 Channels, (at least as early as Mar. 13, 2012), 1 page.
Unistrut General Engineering Catalog, Unistrut Corporation, Mar. 1, 1998; pp. 117, 118.
Power-Strut® Engineering Catalog, Tyco International, 2008, pp. 63, 65.
Non-Final Office action for U.S. Appl. No. No. 14/701,111, Feb. 1, 2016, 10 pages.
Notice of Allowance for U.S. Appl. No. 14/701,111, Jun. 7, 2016, 5 pages.
A guide to threadlocking adhesives, Reliable Plant, May 28, 2013, (online), retrieved on Apr. 27, 2017, retrieved from the internet, https://web.archive.org/web/20130528020650/http:www.reliableplant.com/Read/27159/Guide-to-threadlocking-adhesives.

* cited by examiner

TRAPEZE HANGER SYSTEM INCLUDING TWIST-LOCKING FITTING

CROSS-REFERENCE TO RELATED APPLICATION

This application is a divisional of U.S. application Ser. No. 14/701,111, filed Apr. 30, 2015, which claims priority to U.S. Application No. 61/986,608, filed Apr. 30, 2014, issued as U.S. Pat. No. 9,458,952, the entirety of each of which is incorporated herein by reference.

FIELD OF THE DISCLOSURE

The present invention generally relates to a trapeze hanger system, and a twist-locking fitting of the trapeze hanger system.

BACKGROUND

Pipes, electrical cables and other components in buildings may be secured to a support extending down from an elevated structure, such as a ceiling. For example, a trapeze hanger system may be used to support one or more pipes and/or electrical cables (or other components) within a building. In one example, a trapeze hanger system includes one or more struts, each of which is secured to threaded rods depending from a ceiling. The strut is typically a channel strut including an upper side defining an open channel and a lower side having openings therein. Each threaded rod passes through the open channel in the upper side and one of the openings in the lower side. Nut/washer sets are used to secure the strut to the threaded rods. In particular, an upper nut/washer set and a lower nut/washer set are secured to each rod (i.e., the nuts are threaded on the rods), such that the strut is sandwiched between the upper and lower nut/washer sets to fixedly secure the strut to the threaded rod. When secured to the rods, the strut is spaced from the ceiling in a generally horizontal orientation. The pipes and/or electrical cables may be secured to the upper side of the strut, such as by pipe clamps secured in the open channel from the strut, so that the pipes and/or electrical cables run horizontally in the building.

Although the conventional trapeze hanger system works quite well for suspending components from an elevated structure, it can be time consuming to assembly the trapeze hanger system on site. Moreover, depending on the lengths of the strut used in the trapeze hanger system, it may require at least two installers to assemble the trapeze hanger system on site, which adds to the overall cost of installing.

SUMMARY OF THE DISCLOSURE

In one aspect, a twist-locking fitting for securing a strut to a rod includes a first fitting piece. The first fitting piece includes a first half-nut portion having an interior surface defining a first axis extending through first and second axial ends of the outer half-nut portion. An outer flange extends outward from adjacent the first axial end of the first half-nut portion. An inner flange extends outward from adjacent the second axial end of the first half-nut portion. The inner flange is spaced axially apart from the outer flange of the first fitting piece to define a first clearance gap therebetween. A second fitting piece includes a second half-nut portion having an interior surface defining a second axis extending through first and second axial ends of the outer half-nut portion. An outer flange extends outward from adjacent the first axial end of the second half-nut portion. An inner flange extends outward from adjacent the second axial end of the second half-nut portion. The inner flange is spaced axially apart from the outer flange of the second fitting piece to define a second clearance gap therebetween. The first and second fitting pieces are positionable on the strut in an unsecured position, in which the first and second fitting pieces are movable relative to one another. The first and second fitting pieces are rotatable relative to the strut to move the first and second fitting pieces from the unsecured position to a secured position on the strut, in which the first and second fitting pieces are fixed relative to one another on the strut.

In another aspect, a trapeze hanger system includes a strut having a first side having an outer portion and defining at least one opening, and an interior surface defining an open interior. A twist-locking fitting is configured to secure the strut to a rod. The twist-locking fitting includes a first fitting piece including a first half-nut portion having an interior surface defining a first axis extending through first and second axial ends of the outer half-nut portion. An inner flange extends outward from adjacent the second axial end of the first half-nut portion and is configured for reception in the open interior of the strut through the at least one opening of the first side of the strut. An outer flange extends outward from adjacent the first axial end of the first half-nut portion. The outer flange is spaced axially apart from the inner flange of the first fitting piece such that the outer flange is engageable with the outer portion of the first side of the strut when the inner flange is received in the open interior of the strut. The twist-locking fitting also includes a second fitting piece including a second half-nut portion having an interior surface defining a second axis extending through first and second axial ends of the second half-nut portion. An inner flange extends outward from adjacent the second axial end of the second half-nut portion and is configured for reception in the open interior of the strut through the at least one opening of the first side of the strut. An outer flange extends outward from adjacent the first axial end of the second half-nut portion. The outer flange is spaced axially apart from the inner flange of the second fitting piece such that the outer flange is engageable with the outer portion of the first side of the strut when the inner flange is received in the open interior of the strut. The first and second fitting pieces are positionable on the strut in an unsecured position, in which the first and second fitting pieces are movable relative to one another. The first and second fitting pieces are rotatable relative to the strut to move the first and second fitting pieces from the unsecured position to a secured position on the strut, in which the first and second fitting pieces are fixed relative to one another on the strut.

In yet another aspect, a method of forming a trapeze hanger system includes inserting inner flanges of respective first and second fitting pieces into an open interior of a strut through an opening extending through a first side of the strut. A rod is inserted between opposing half-nut portions of the first and second fitting pieces. After inserting the rod, the first and second fitting pieces are rotated relative to the strut to position the first and second fitting pieces in a secured position, in which the first and second fitting pieces are fixed relative to one another on the strut.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
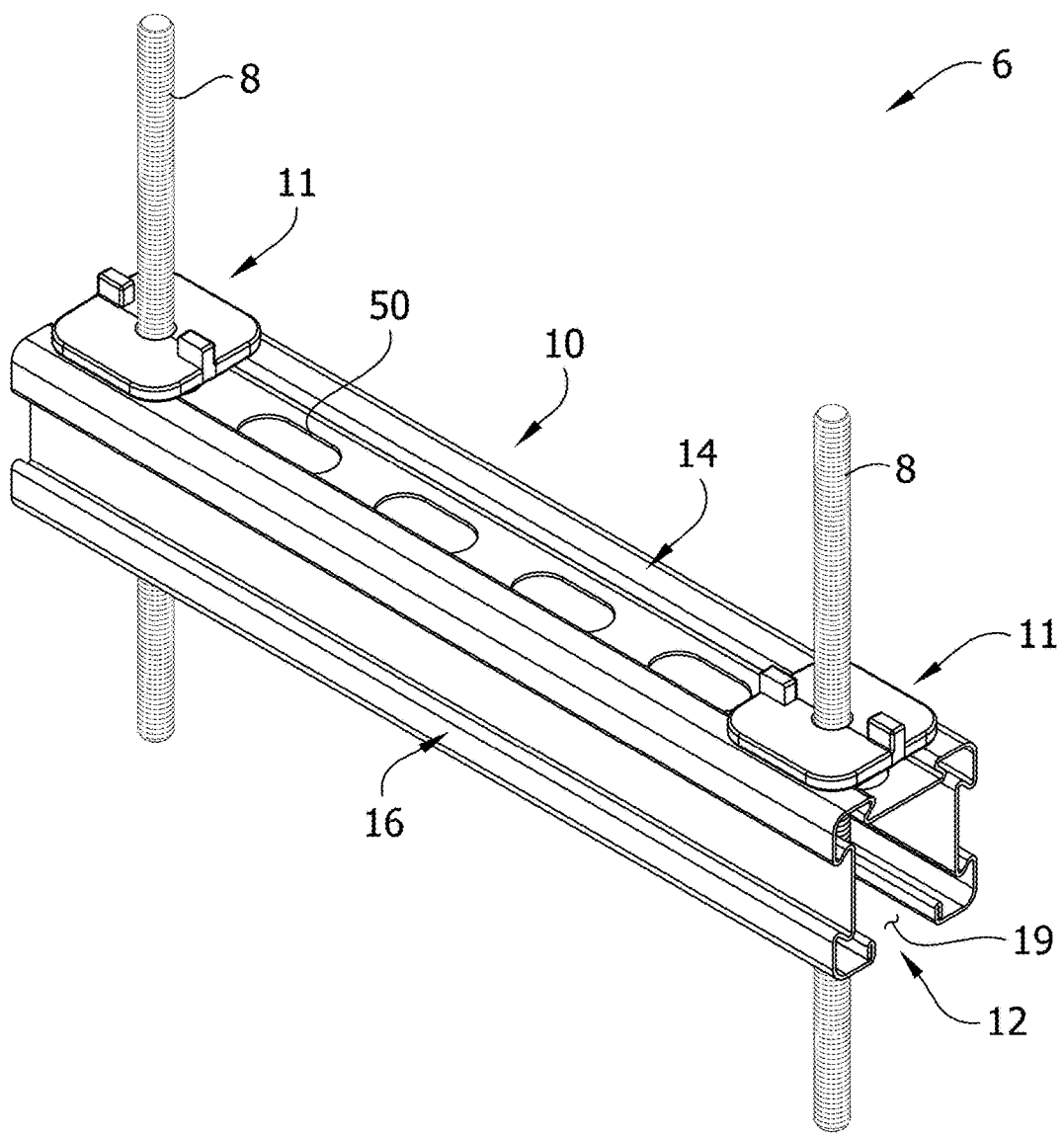
FIG. 1 is a front perspective of one embodiment of an assembled trapeze hanger system, the system including a strut, a pair of threaded rods, and a pair of twist-locking fittings.
Figure 2:
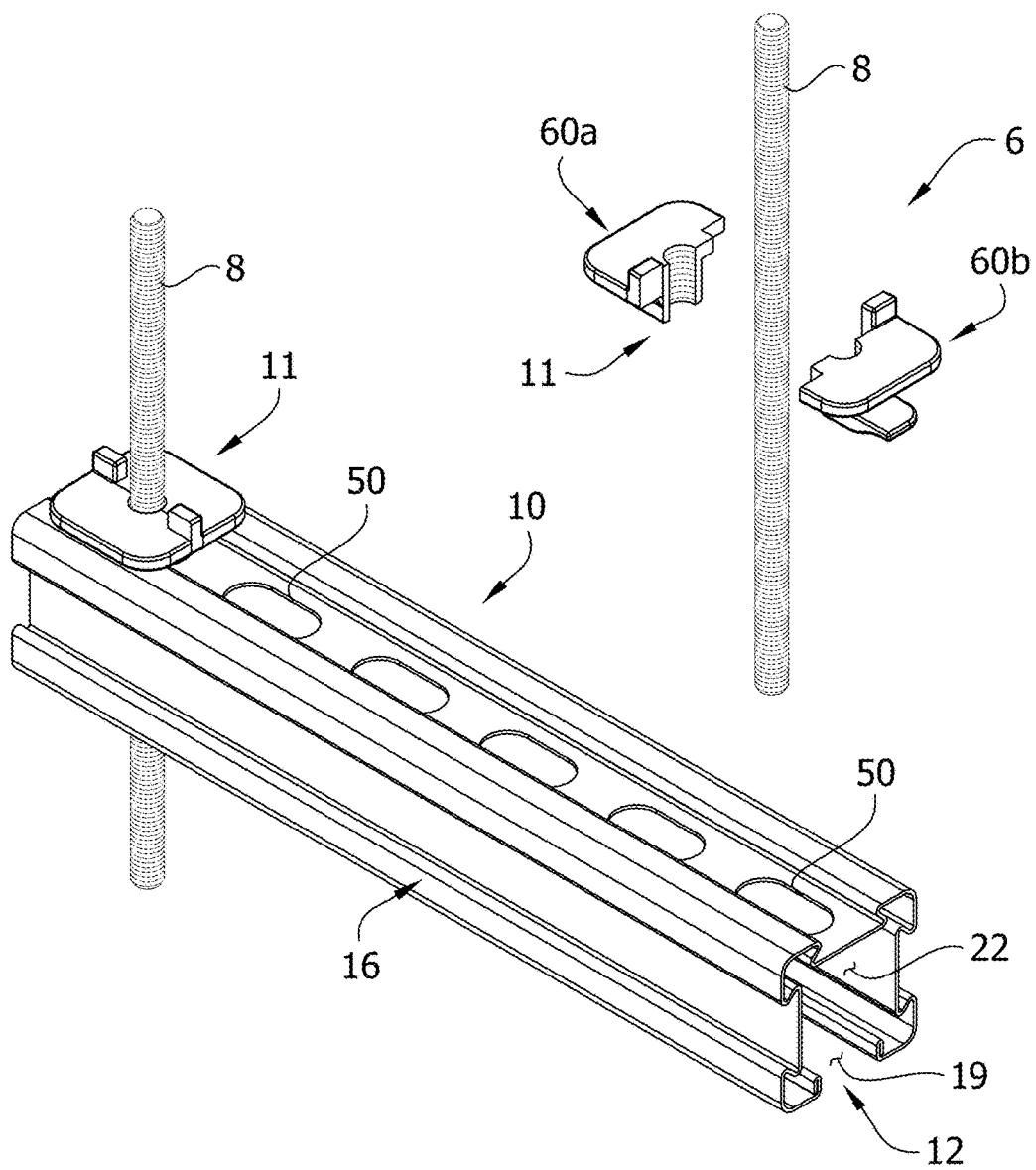
FIG. 2 is an exploded view of the trapeze hanger system.
Figure 11:
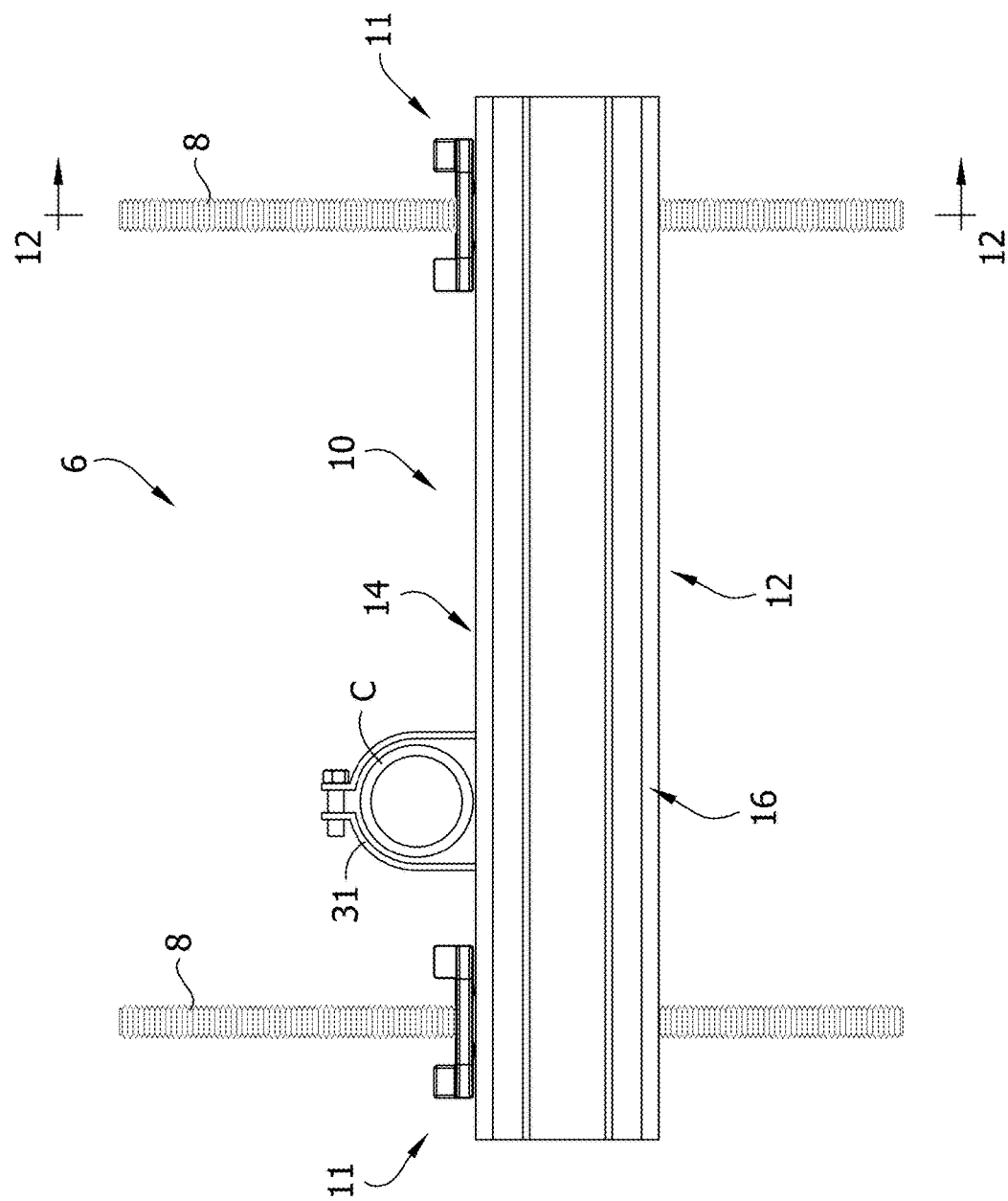
FIG. 11 is an elevation of the assembled trapeze hanger system of FIG. 1.

Referring to FIGS. 1 and 2, the present disclosure is directed to a trapeze hanger system, one embodiment of which is indicated generally at reference numeral 6. The trapeze hanger system 6 includes rods 8 (e.g., two threaded rods), a strut, generally indicated at reference numeral 10, and twist-locking fittings, each generally indicated at 11, for securing the strut to the threaded rods. In general, and as shown in FIG. 11, for example, the trapeze hanger system 6 is used to support one or more components C (e.g., pipes, electrical cables, cable trays, and the like) within a building or other structure. As explained in more detail below, in use the trapeze hanger system 6 is suspended from an elevated structure (e.g., a ceiling) and the components C may be supported by and secured to the strut 10 using suitable component fittings.

Figure 3:
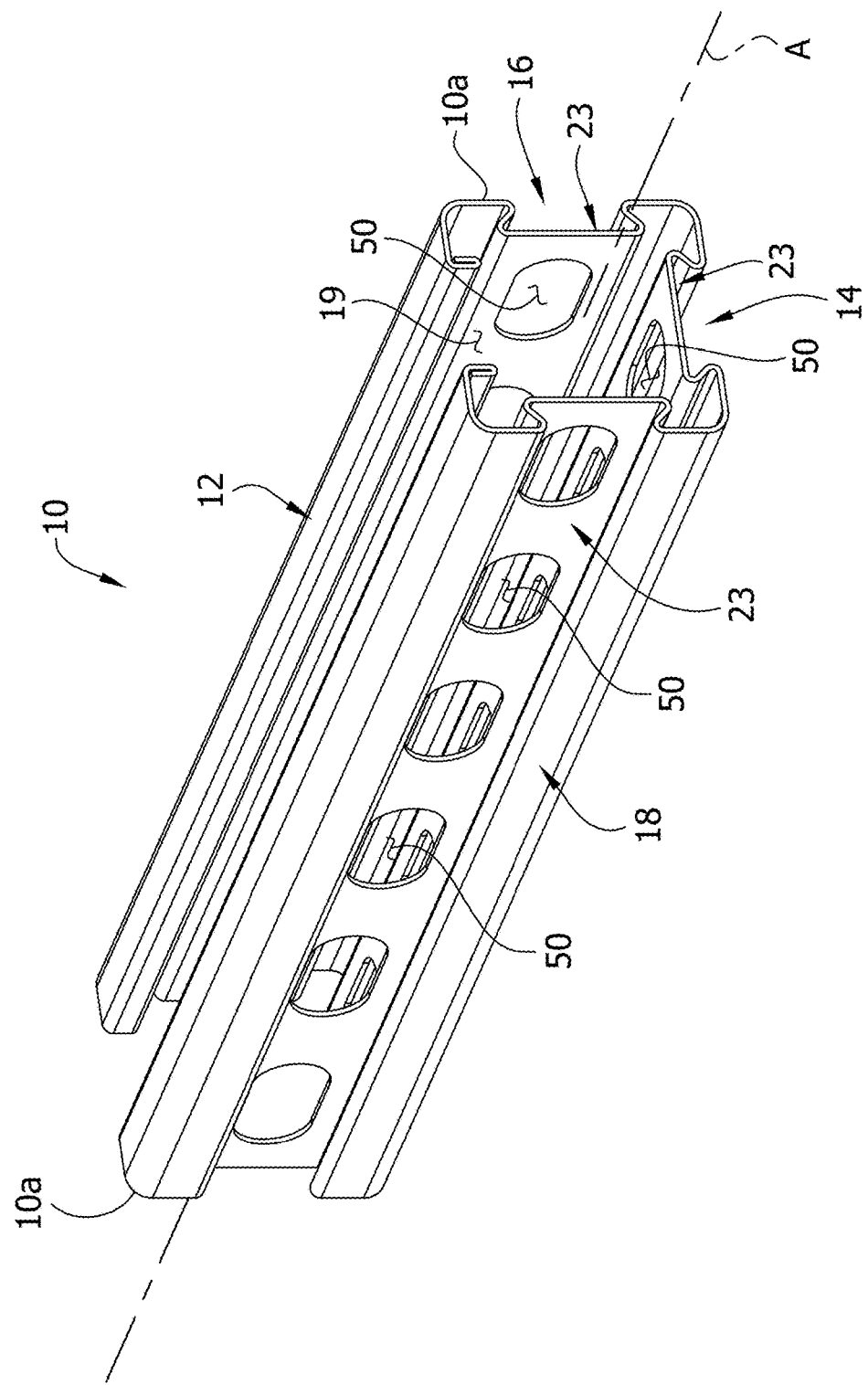
FIG. 3 is a front perspective of one embodiment of a strut for use in the trapeze hanger system.
Figure 4:
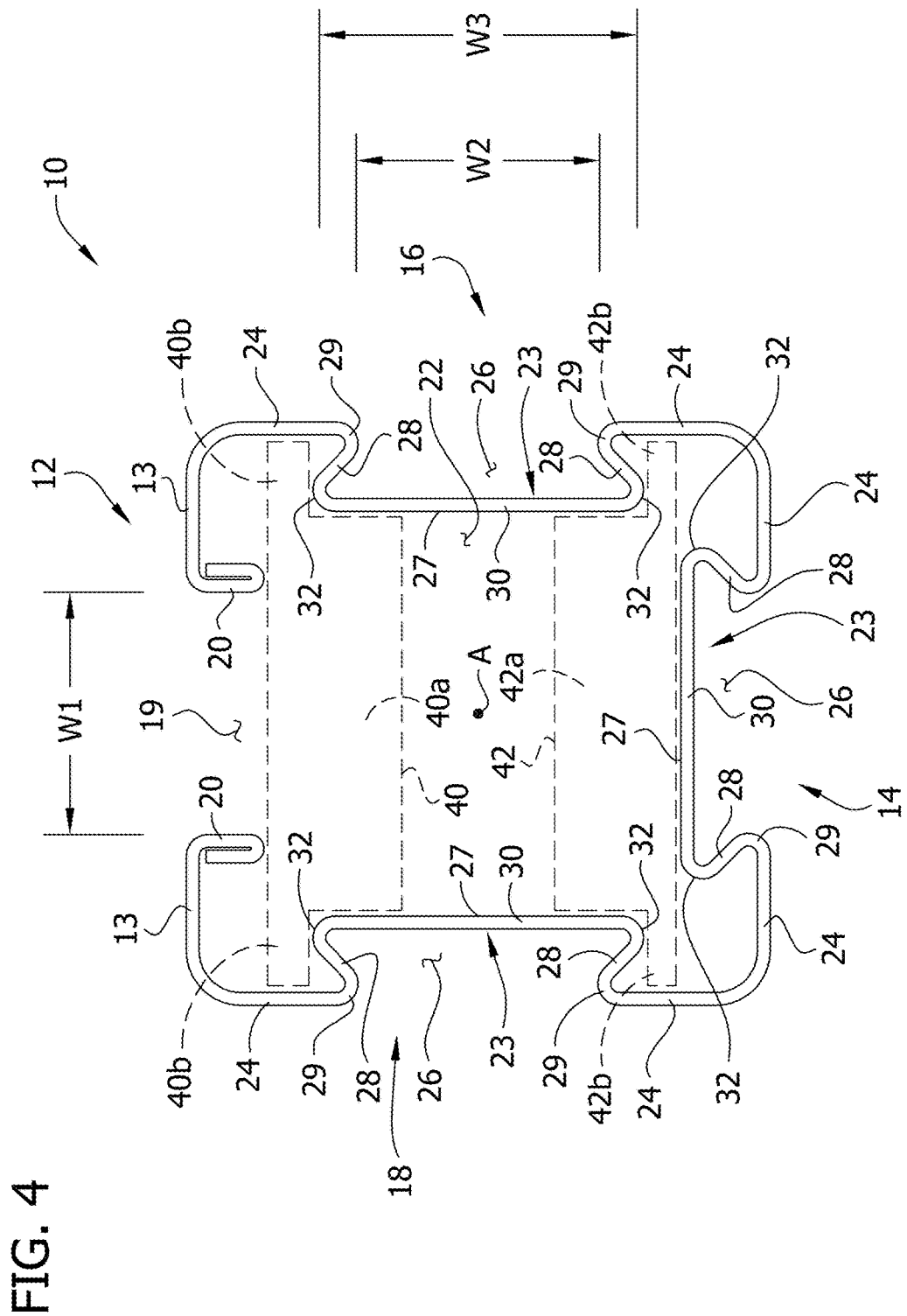
FIG. 4 is a front elevation of the strut, with upper and lower T-shaped tracks defined by an interior of the channel framing being shown in broken lines.
Figure 5:
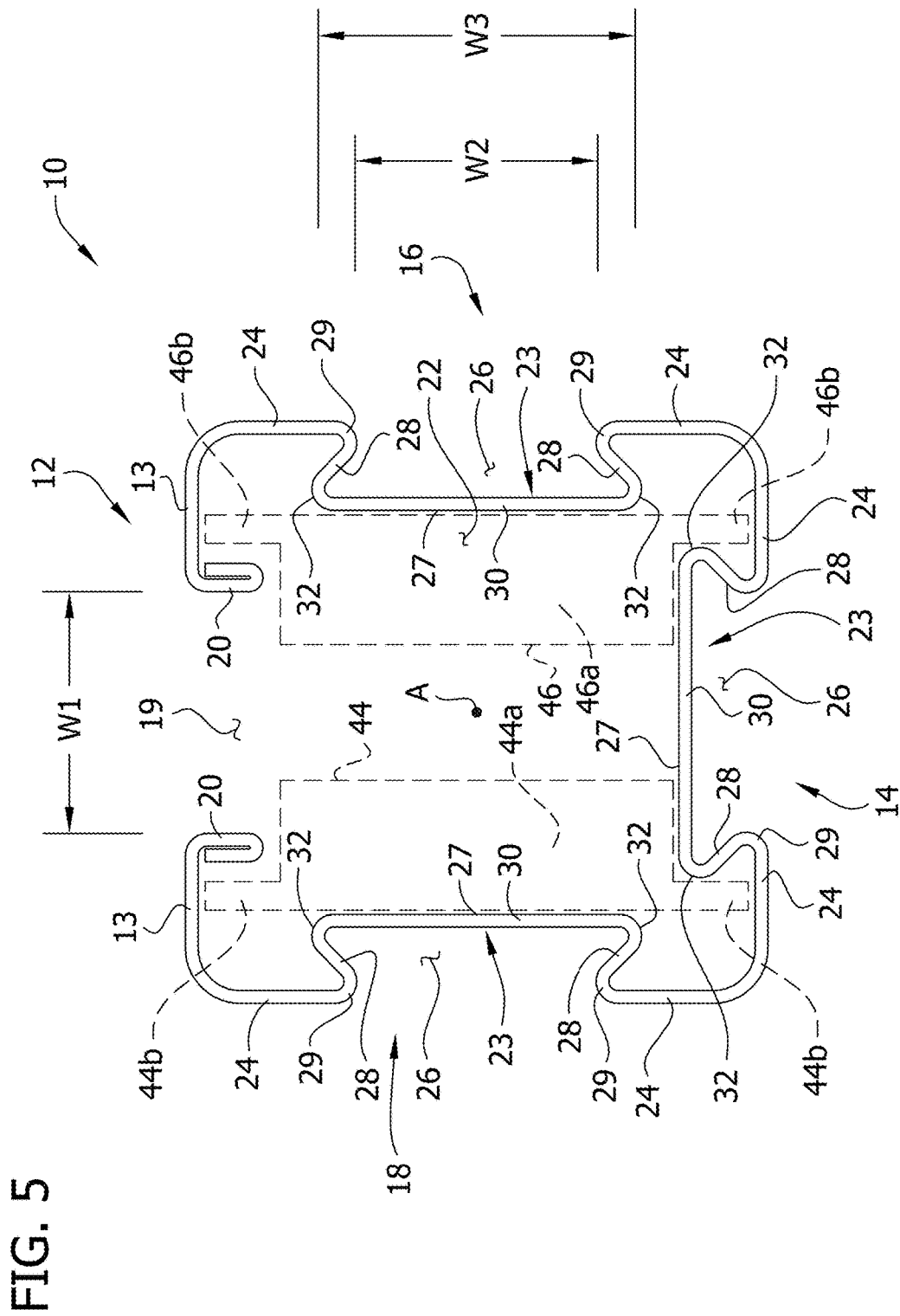
FIG. 5 is similar to FIG. 4, except with left and right T-shaped tracks defined by an interior of the channel framing being shown in broken lines.

One embodiment of the strut 10 is shown in FIGS. 3-5, which is similar to the embodiment shown in FIGS. 1 and 2. The strut 10 is elongate with a generally square or rectangular cross-sectional shape having four sides and a longitudinal axis A extending along its length and through opposite open longitudinal ends 10a of the strut 10. As illustrated, the strut has an upper side 12, a lower side 14, a right side 16, and a left side 18 (each indicated generally). As used throughout the present disclosure with respect to the strut 10, the terms defining relative locations and positions of structures and components of the strut, including but not limited to the terms "upper," "lower," "right," "left," "top," and "bottom," are meant to provide a point of reference for such components and structures when the strut is orientated as shown in FIGS. 3-5. (Accordingly, in FIGS. 1 and 2, for example, the strut is oriented "up-side down," relative to its orientation in FIGS. 3-5, such that the upper side 12 of the strut 10 is facing downward, and the lower side of the strut is facing upward. As explained below, the strut 10 may be oriented "right-side up" in other configurations.) Moreover, the terms "inner" and "outer" are relative locations with respect to the longitudinal axis A of the strut 10. The upper side 12 (or slot side) of the strut 10 defines a continuous opening or slot 19 (i.e., the upper side is open) having a width W1 (FIG. 2). The upper side 12 has outer portions 13 on either side of the slot 19, and inturned (or downwardly extending, as illustrated) lips 20 defining the slot and leading to an open interior 22 of the strut 10. The open longitudinal ends 10a also lead to the open interior 22 of the strut 10.

As illustrated, each of the lower, right and left sides 14, 16, 18, respectively, of the strut 10 has an inward portion, generally indicated at 23, and opposite outer portions 24 on either side of the inward portion, extending lengthwise of the strut 10. An exterior surface of the inward portion 23 defines an external fitting groove 26, and an interior surface of the inward portion defines an internal rail 23. Thus, the illustrated strut 10 includes respective left, right, and lower external fitting grooves 26 and corresponding left, right, and lower internal rails 23. Each inward portion 23 includes opposing side walls 28 extending generally inwardly from the respective ones of the outer portions 24 of the corresponding side 14, 16, 18, which form opposing external shoulders 29 at the junctions of the side walls and corresponding outer portion. The side walls 28 extend to a planar inner wall 30 that spans between and interconnects the side walls. The side walls 28 flare away from one another as they extend inward from the outer portions 24 toward the inner wall 30 so that each inward portion 23 has a generally dovetail cross-sectional shape or longitudinal end profile. It is understood that the inner portion 23, including one or both of the fitting groove 26 and the internal rail 23, may be of other shapes and configurations without departing from the scope of the present disclosure.

Referring to FIG. 3, the fitting grooves 26 may be substantially identical to one another, as illustrated. Each fitting groove 26 has a generally dovetail-shaped profile with a first relatively narrower width W2 (e.g., a minimum width) adjacent its entrance and a second relatively wider width W3 (e.g., a maximum width) adjacent the inner wall 30. In the illustrated embodiment, the fitting grooves 26 may be used for securing a component fitting, such as a pipe clamp 31 (FIGS. 10 and 16), to the strut 10. The component fitting 31, in turn, secures a component C (e.g., a pipe, electrical cable, cable tray, or the like) to the strut 10. The component fitting 31 may include a coupling component that is complementary to the fitting grooves 26 (e.g., a dovetail-shaped coupling component that can be inserted into the dovetail-shaped fitting groove) to secure the fitting to the strut 10. Suitable component fittings for the fitting groove 26 are disclosed in U.S. patent application Ser. No. 13/966,897, filed Aug. 14, 2013, the entirety of which is hereby incorporated by reference. Suitable component fittings for the slot 19 are generally known in the art.

Each internal rail 23 has a generally dovetail-shaped profile with opposite internal shoulders 32 at the junctions of the inner wall 30 and the side walls 28. Accordingly, the left and right rails 27 have upper and lower internal shoulders 32, as shown in FIGS. 4 and 5, and the lower rail 27 has left and right internal shoulders 32, as illustrated. The interior surface of the strut 10, including the rails 27, defines at least one track in which the twist-locking fitting 11 can be inserted for connecting the twist-locking fitting to the strut, as explained in more detail below. Referring to FIGS. 3 and 4, in the illustrated embodiment the interior 22 of the strut 10 has four (4) separate tracks, each of which has an effective T-shape in cross section (i.e., a "T-shaped track"). It is understood that the tracks may have other cross-sectional shapes. FIG. 2 includes a general outline (shown in broken line) of both a first T-shaped track 40 (e.g., an upper T-shaped track), defined by the inturned lips 20, and the upper shoulders 32 and inner faces (defined by the inner walls 30) of the respective left and right internal rails; and a second T-shaped track 42 (e.g., a lower T-shaped track), defined by the lower shoulders 32 and inner faces (defined by the inner walls 30) of the respective left and right internal rails 23, and the inner face (defined by the inner wall 30) of the lower internal rail. FIG. 3 includes a general outline (shown in broken line) of both a third T-shaped track 44 (e.g., a left T-shaped track), defined by the left inturned lip 20, the inner face (defined by the inner wall 30) of the left internal rail 23, and the left shoulder and inner face (defined by the inner wall 30) of the lower internal rail; and a fourth T-shaped track 46 (e.g., a right T-shaped track) defined by the right inturned lip 20, the inner face (defined by the inner wall 30) of the right internal rail 23, and the right shoulder and inner face (defined by the inner wall 30) of the lower internal rail. Each of the illustrated T-shaped tracks 40, 42, 44, 46 have a stem portion 40a, 42a, 44a, 46, respectively, and a crosswise portion(s) or wings 40b, 42b, 44b, 46b, respectively, extending generally transverse (e.g., perpendicular) to the corresponding stem portion.

In the strut 10 illustrated in FIGS. 3-5, openings 50 extend through each of the inner walls 30 of the inward portions 23 of the left, right, and lower sides 18, 16, 14, respectively. In other embodiments, the openings 50 may be in the lower side 14 and, only optionally, in the left and right sides 18, 16, respectively. For example, the strut 10 illustrated in FIGS. 1 and 2 has openings 50 in only the lower side 14 (i.e., the left and right sides 18, 16 are free from the openings. The openings 50 may be, for example, knockouts, or punched, or half-slots, or slots, as are generally known in the art. Typically, the openings 50 in the strut 10 will be the same type of opening, although the same strut may include a mix of different types of openings, such as shown in the illustrated embodiments. It is also understood that the sides may not include openings without departing from the scope of the present invention.

Figure 6:
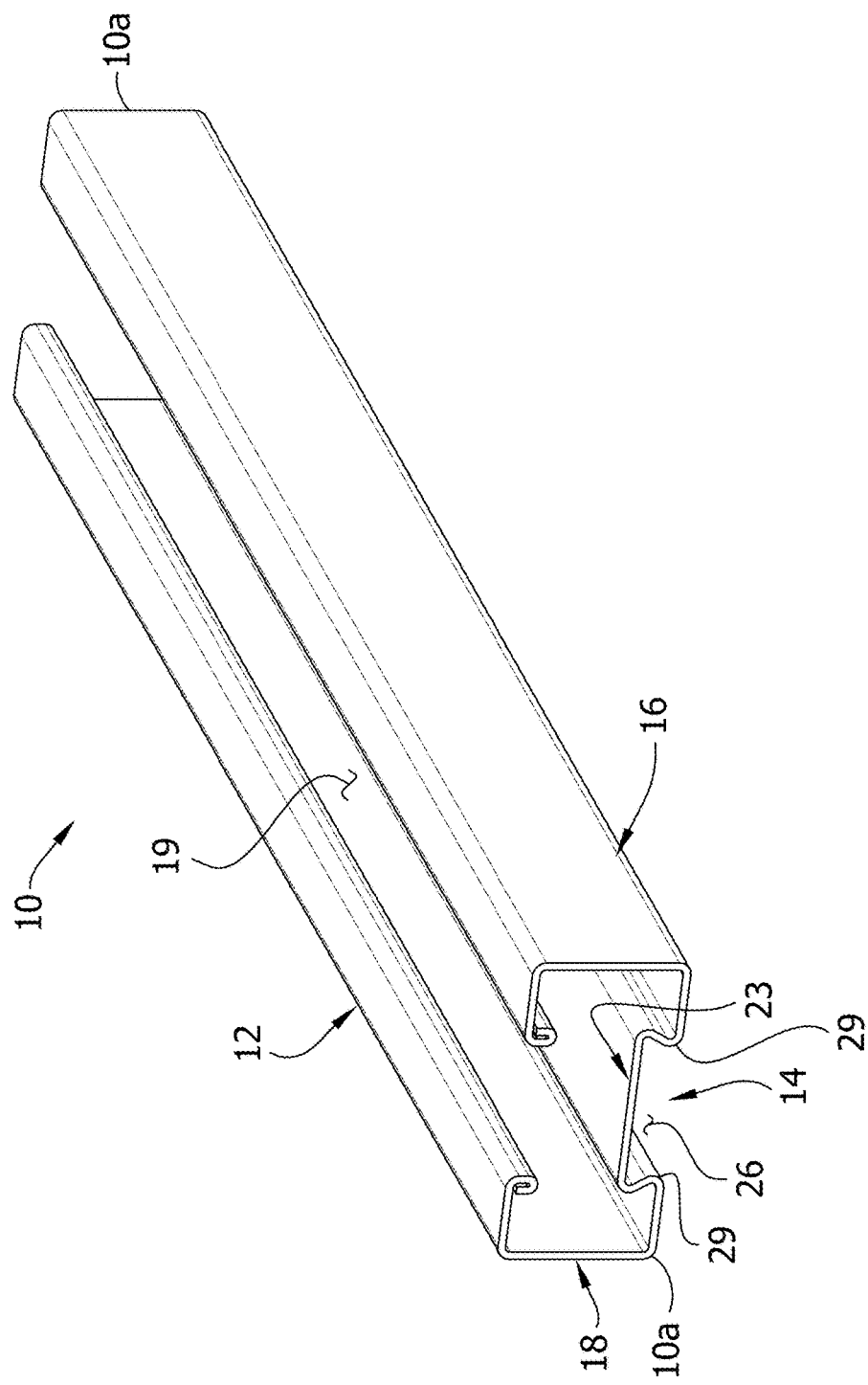
FIG. 6 is a perspective of another embodiment of strut for use in the trapeze hanger system.

Yet another embodiment of a strut suitable for use with the trapeze hanger system 6, and in particular the fitting 11, is indicated generally by the same reference numeral 10 in FIG. 6. Structures of the present strut 10 that are the same or similar to the structures of the strut embodiment illustrated in FIGS. 3-5 are indicated by corresponding reference numerals. This strut 10 is similar to the strut in FIGS. 3-5, except that the left and right sides 18, 16 have widths extending between the upper and lower sides 12, 14 that are less than the widths of the left and right sides of the embodiment shown in FIGS. 3-5. Moreover, the left and right sides 18, 16 of the present embodiment do not include the inward portions (or the grooves and internal rails), but instead, the left and right sides are generally planar.

In one example, the strut 10 may be formed from a sheet of rigid metal, such as low carbon steel, stainless steel, aluminum, or other metals, or from other material, such as fiberglass or plastic. The strut 10 may be cold formed using a rolling mill, such as when forming the strut from steel, or the strut may be extruded from an extrusion die, such as when forming the strut from aluminum. The strut 10 may be formed in other ways. The strut 10 may be formed from a metal sheet having uniform thickness from about 0.5 mm to about 4 mm. In one non-limiting example, the strut 10 may be formed from 18 gauge (1.2 mm) steel sheet metal, or from 20 gauge (0.9 mm) steel sheet metal. In another non-limiting embodiment, the dimension of each of the width and height of the strut 10 may be 53.5 mm, as opposed to 50 mm.

Figure 7:
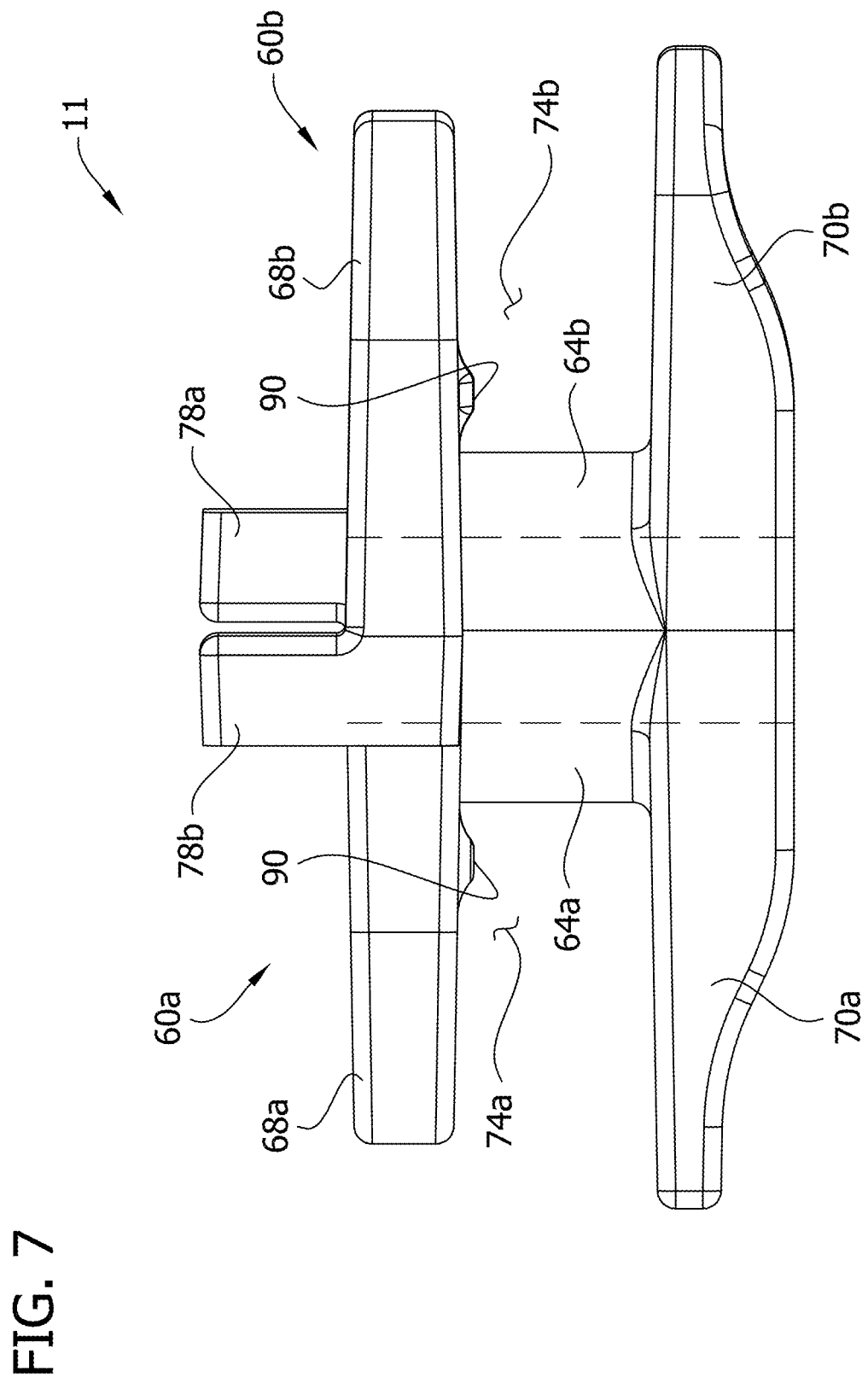
FIG. 7 is an elevation of the twist-locking fitting for use in the trapeze hanger system.
Figure 8:
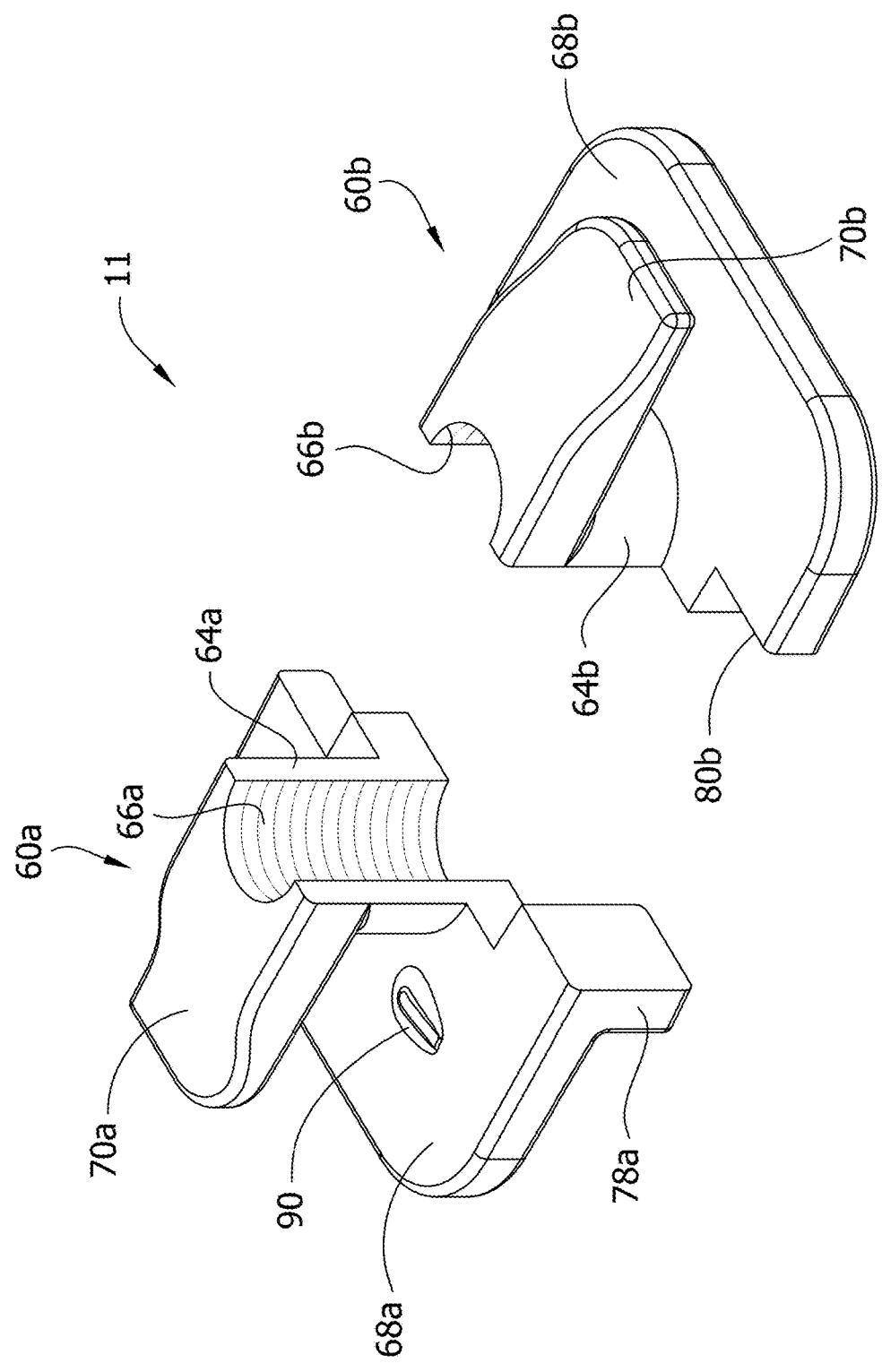
FIG. 8 is an exploded bottom perspective of the twist-locking fitting.
Figure 10:
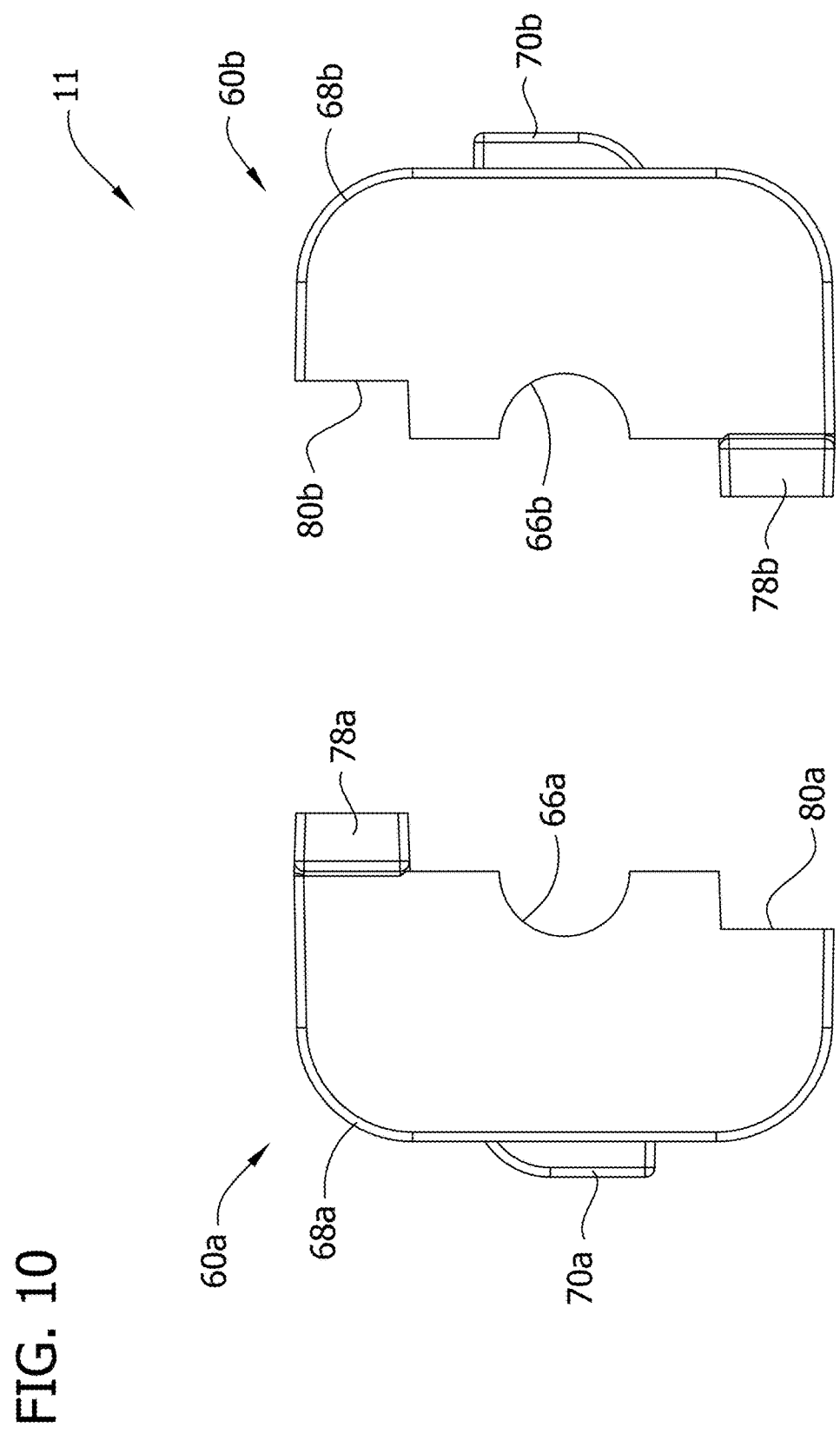
FIG. 10 is a top plan of FIG. 8.

Referring to FIGS. 2, 7 and 10, the twist-locking fitting 11 comprises first and second fitting pieces (or sections), generally indicated at 60a, 60b, respectively. In the illustrated embodiment, the fitting pieces 60a, 60b are wholly separable from another (as shown in FIG. 2). In other embodiments, the fitting pieces 60a, 60b may remain connected to one another, while allowing the pieces to move relative to one another. Each fitting piece 60a, 60b includes a half-nut portion 64a, 64b, respectively. Arcuate interior surfaces 66a, 66b of the half-nut portions 64a, 64b are threaded (i.e., the half-nuts are internally threaded) to mate with the thread(s) on the rod 8. The interior surfaces 66a, 66b define axes A2, A3, respectively, of the half-nut portions 64a, 64b. The threaded interior surface 66a 66b of each half-nut portion 64a, 64b does not necessarily (although it may) have a circumference that subtends exactly (or substantially) 180 degrees relative to the corresponding axis A2, A3. In other words, each half-nut portion 64a, 64b is not necessarily one-half of a full nut, which has a threaded interior surface subtending 360 degrees relative it its axis.

Figure 9:
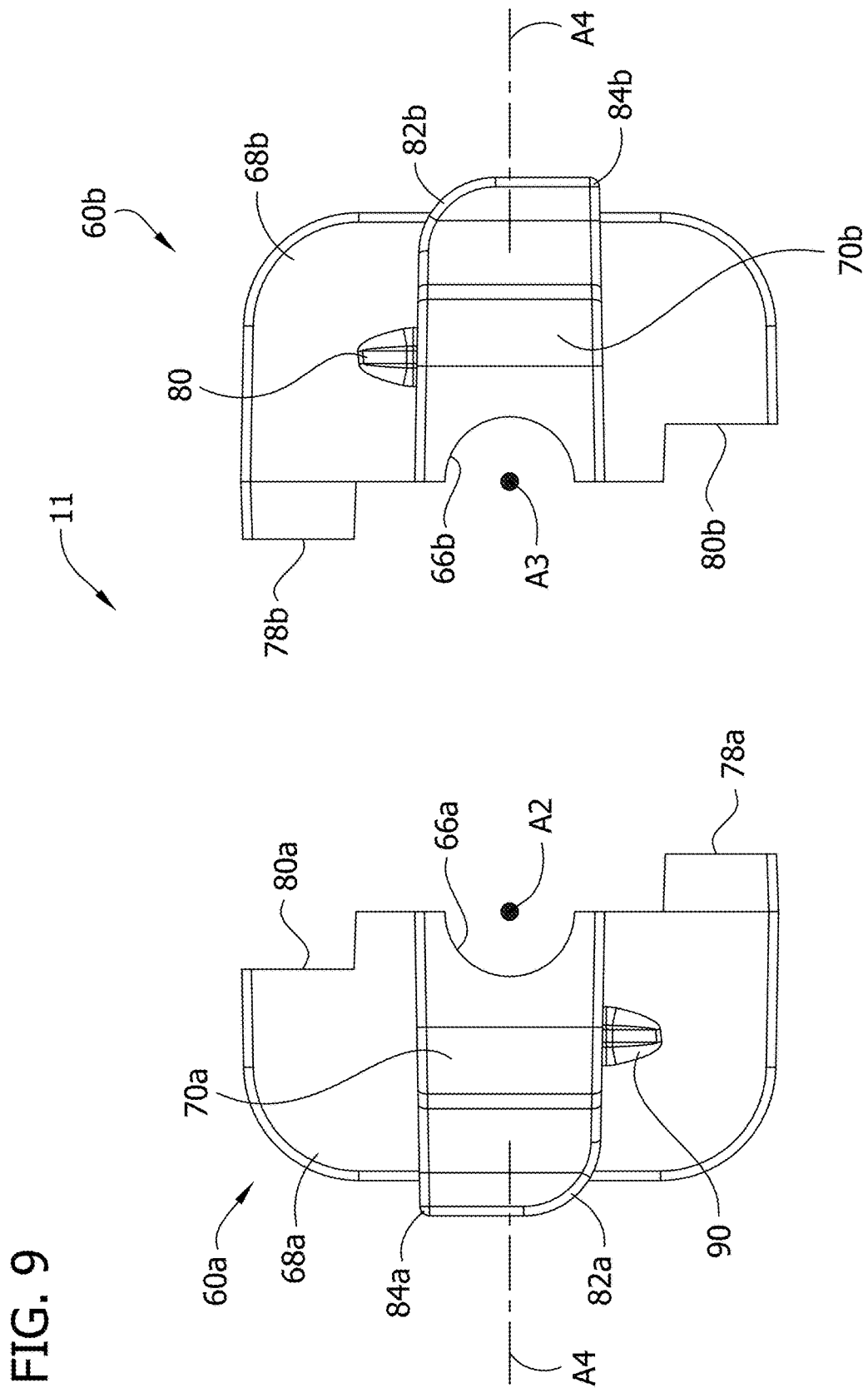
FIG. 9 is a bottom plan of FIG. 8.

Each fitting piece 60a, 60b further includes a first flange portion 68a, 68b, respectively, projecting outward from adjacent a first axial end of the half-nut portion 64a, 64b, and a second flange portion 70a, 70b, respectively, projecting outward from adjacent a second axial end of the half-nut portion and generally opposing the first flange portion. Each of the first flange portions 68a, 68b is referred to herein as an "outer flange portion" because, as explained below, the first flange portions are outside the strut 10 when secured to thereto. Likewise, each of the second flange portions 70a, 70b is referred to herein as an "inner flange portion" because, as explained below, the second flange portions are inside the interior 22 of the strut 10 when secured to thereto. The outer and inner flange portions 68a, 70a and 68b, 70b are axially spaced apart from one another to define a clearance gap 74a, 74b. As shown in FIGS. 7 and 9, for example, each outer flange portion 68a, 68b has a tab 78a, 78b on one side of the half-nut axis A2, A3 projecting outward from the outer flange portion, and a tab-receiving recess 80a, 80b on the other side of the half-nut axis.

As can be seen from FIGS. 2 and 7-10, the first and second fitting pieces 60a, 60b are configured to be brought together, on either side of the rod 8, so that each projection tab 78a, 78b is received in a corresponding tab recess 80a, 80b and the half-nut portions 64a, 64b form a complete (or substantially complete) nut portion that mates with the threaded rod 8. The first and second fitting pieces 60a, 60b are substantially identical other than the internal threads of the respective half-nut portions 64a, 64b. In particular, the internal threads are offset 180 degrees with respect to one another so that the internal threads form a continuous thread when the first and second fitting pieces 60a, 60b are brought together.

Referring to FIGS. 13-23, the twist-locking fitting 11 is used to quickly and easily secure the strut 10 to the rods 8. These figures illustrate steps of an exemplary method for attaching the strut 10 to a first rod 8 using a first twist-locking fitting, with the understanding that the strut 10 is also secured to a second rod using a second twist-locking fitting identical to the first twist-locking fitting to complete assembly of the trapeze hanger assembly 6.

Figure 13:
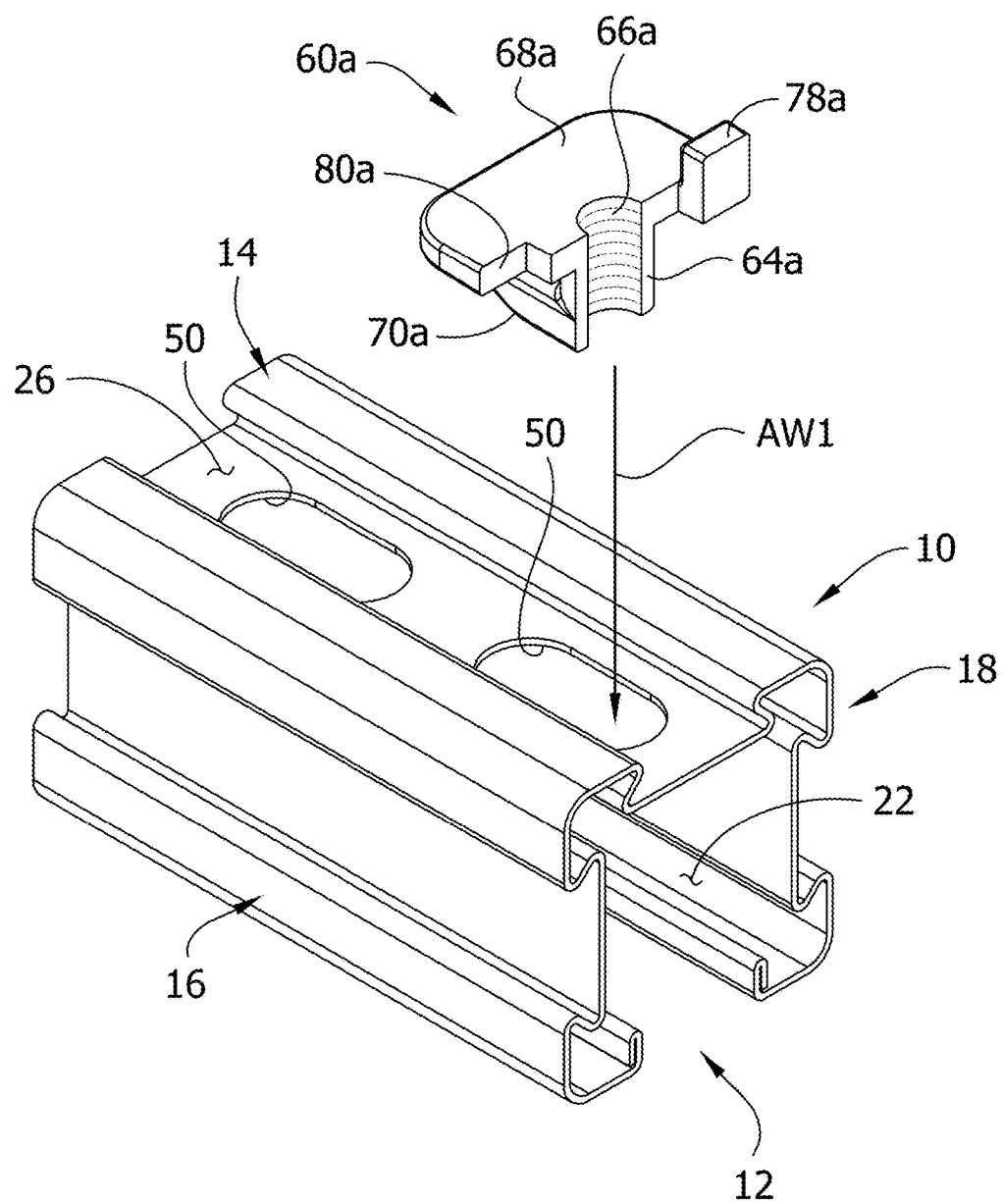
FIG. 13 is a partial perspective illustrating a first step of an exemplary method of attaching the twist-locking fitting and the threaded rod to the strut.

An exemplary first step of the method is shown in FIG. 13. In this exemplary first step, the first fitting piece 60a is oriented such that an axis A4 of the inner flange 70a is generally aligned along the lengths of the external fitting groove 26 of the lower side 14 of the strut 10 and a selected one of the openings 50 extending through the inward portion 23. The inner flange 70a of the first fitting piece 60a is then inserted through both the external fitting groove 26 and the selected opening 50 and into the interior space 22 of the strut 10 (as shown by arrow AW1). The first fitting piece 60a may be rotated during insertion of the inner flange 70a such that the terminal end of the inner flange is the leading structure entering the selected opening 50. With the inner flange 70a in the interior space 22 of the strut, the outer flange 68a engages the outer portions 24 of the lower side 14 and lies generally parallel to the outer portions (see, e.g., FIG. 14).

Figure 14:
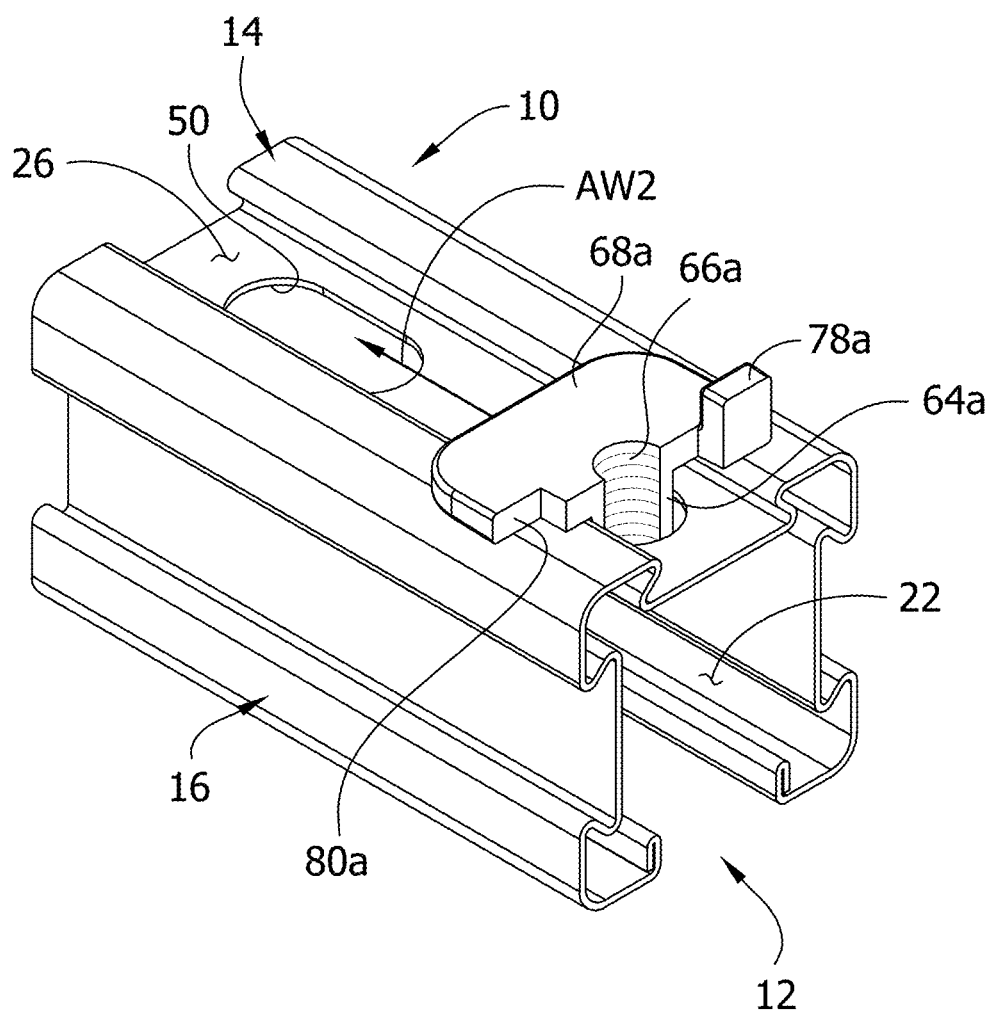
FIG. 14 is similar to FIG. 13 illustrating a second step of the exemplary method.

An exemplary second step of the method is shown in FIG. 14. In this exemplary second step, the first fitting piece 60a is moved (e.g., slidably moved) along the lengths of the strut 10 and the selected opening 50 (in the direction in which the inner flange 70a extends; shown by arrow AW2) so that the inward portion 23 of the lower side 14 enters the clearance gap 74a. The first fitting piece 60a may be moved relative to the strut 10 until the half-nut portion 64a engages the peripheral edge of the selected opening 50. This position of the first fitting piece is shown in FIG. 15.

Figure 15:
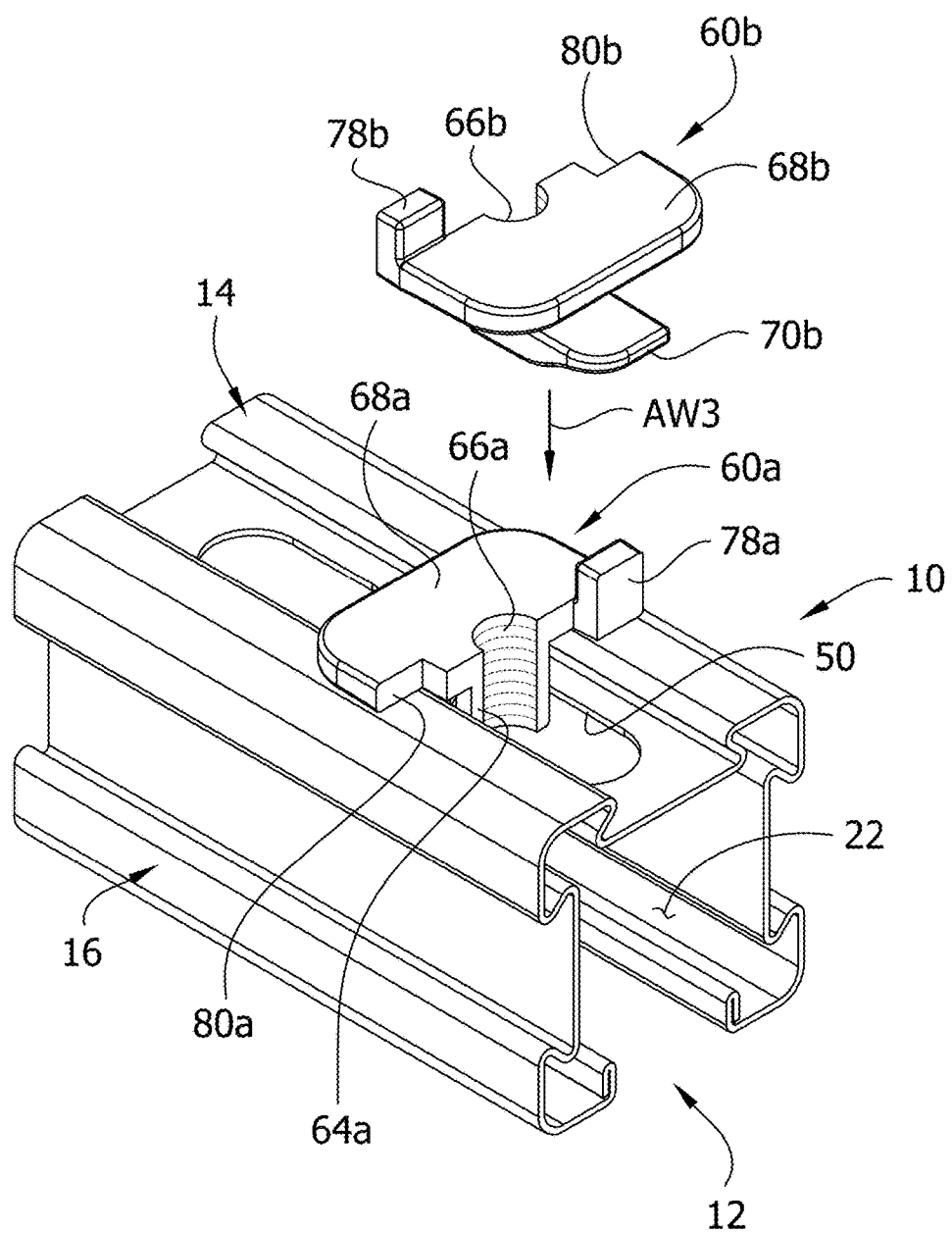
FIG. 15 is similar to FIG. 13 illustrating a third step of the exemplary method.

An exemplary third step of the method is shown in FIG. 15. In this exemplary third step, the second fitting piece 60b is oriented such that the axis A4 of the inner flange 70b is generally aligned along the lengths of the external fitting groove 26 of the lower side 14 of the strut 10 and the selected one of the openings 50 extending through the inward portion 23, and the half-nut portion 64b faces the half-nut portion 64a of the first fitting piece 60a. The inner flange 70b is then inserted through both the external fitting groove 26 and the selected opening 50 and into the interior space 22 of the strut 10 (as shown by arrow AW3). The second fitting piece 60b may be rotated during insertion of the inner flange 70b such that the terminal end of the inner flange is the leading structure entering the selected opening 50. With the inner flange 70ba in the interior space 22 of the strut, the outer flange 68b engages the outer portions 24 of the lower side 14 and lies generally parallel to the outer portions (see, e.g., FIG. 16). Moreover, the first and second fitting pieces 60a, 60b may be substantially together to form the closed nut, as shown in FIG. 16.

Figure 16:
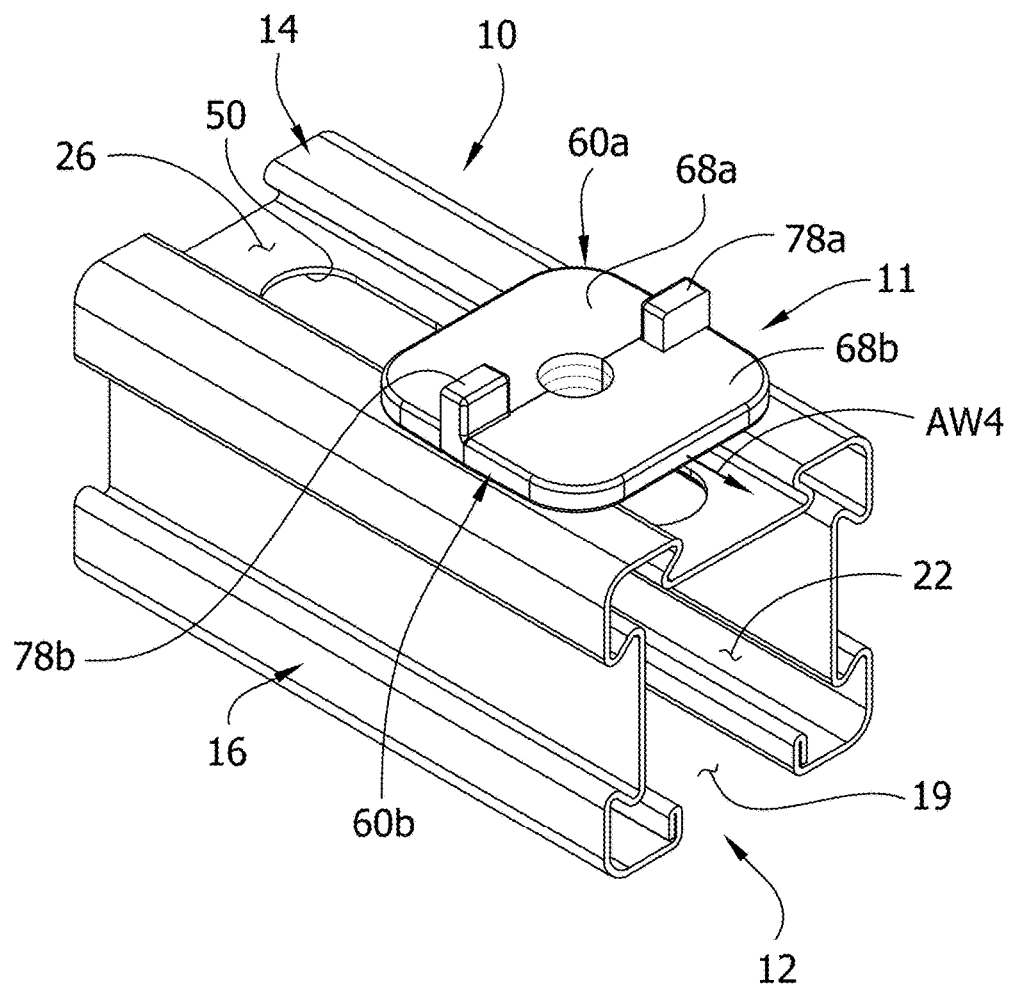
FIG. 16 is similar to FIG. 13 illustrating a fourth step of the exemplary method.
Figure 17:
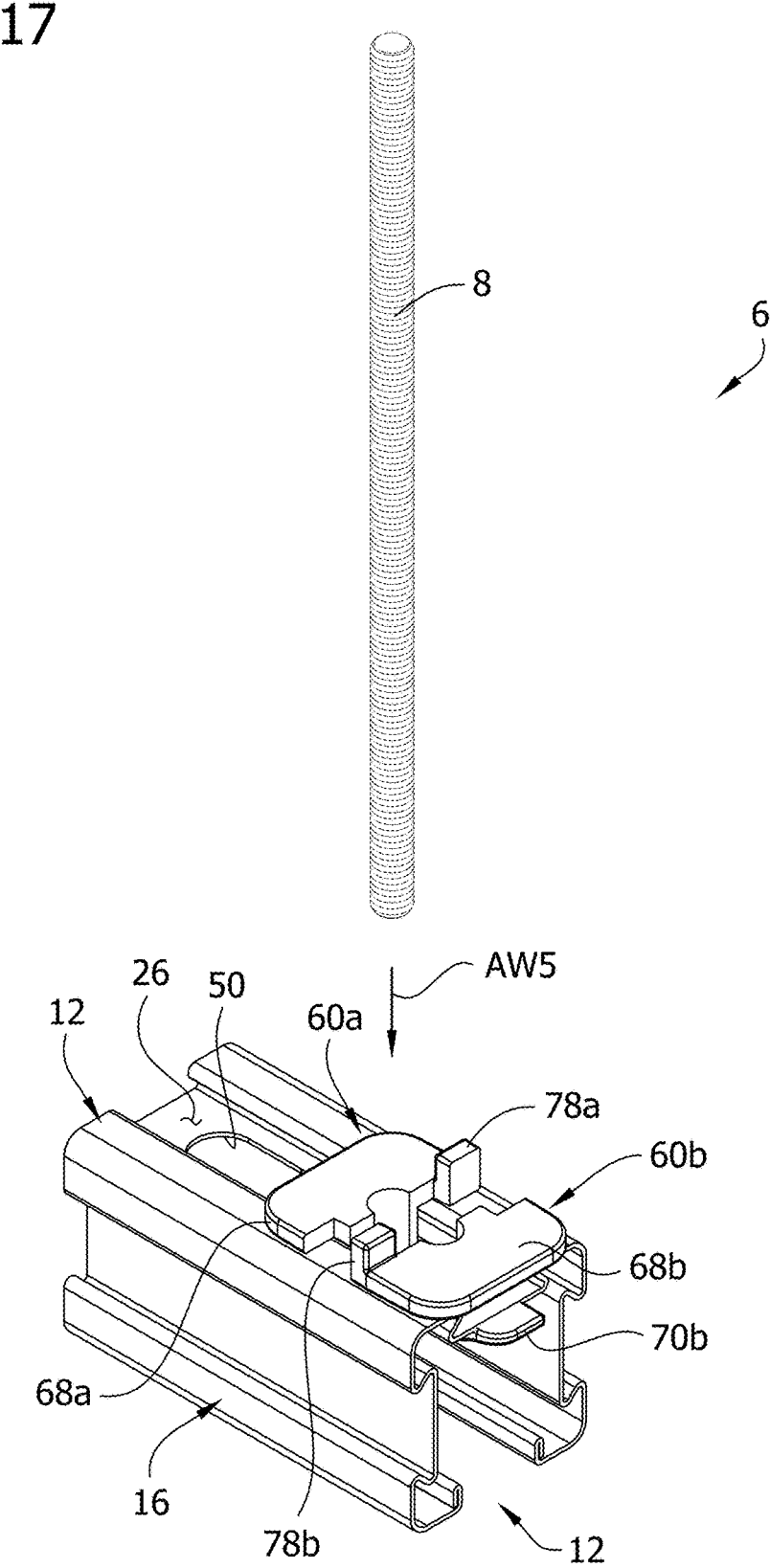
FIG. 17 is similar to FIG. 13 illustrating a fifth step of the exemplary method.

An exemplary fourth step of the method is shown in FIG. 16. In this exemplary fourth step, the second fitting piece 60b is moved (e.g., slidably moved) along the lengths of the strut 10 and the selected opening 50 (in the direction in which the inner flange 70b extends; shown by arrow AW4) so that the inward portion 23 of the lower side 14 enters the clearance gap 74b. The second fitting piece 60b may slide relative to the strut 10 until the half-nut portion 64a engages the peripheral edge of the selected opening 50. This position of the second fitting piece 70b is shown in FIG. 17. As shown in FIG. 17, the first and second fitting pieces 60a, 60b are spaced apart from one another along the lengths of the strut 10 and the selected opening 50 and the half-nut portions 64a, 64b generally oppose one another.

An exemplary fifth step of the method is shown in FIG. 17. In this exemplary fifth step, the threaded rod 8 is inserted between the arcuate interior surfaces 66a, 66b of the half-nut portions 64a, 64b of the first and second fitting pieces 60a, 60b (as shown by arrow AW5) such that the axis of the rod is generally parallel to the axes A2, A3 of the half-nut portions. In one example, the strut 10 is positioned along the length of the rod 8 after inserting the rod between the first and second fitting pieces 60a, 60b.

Figure 18:
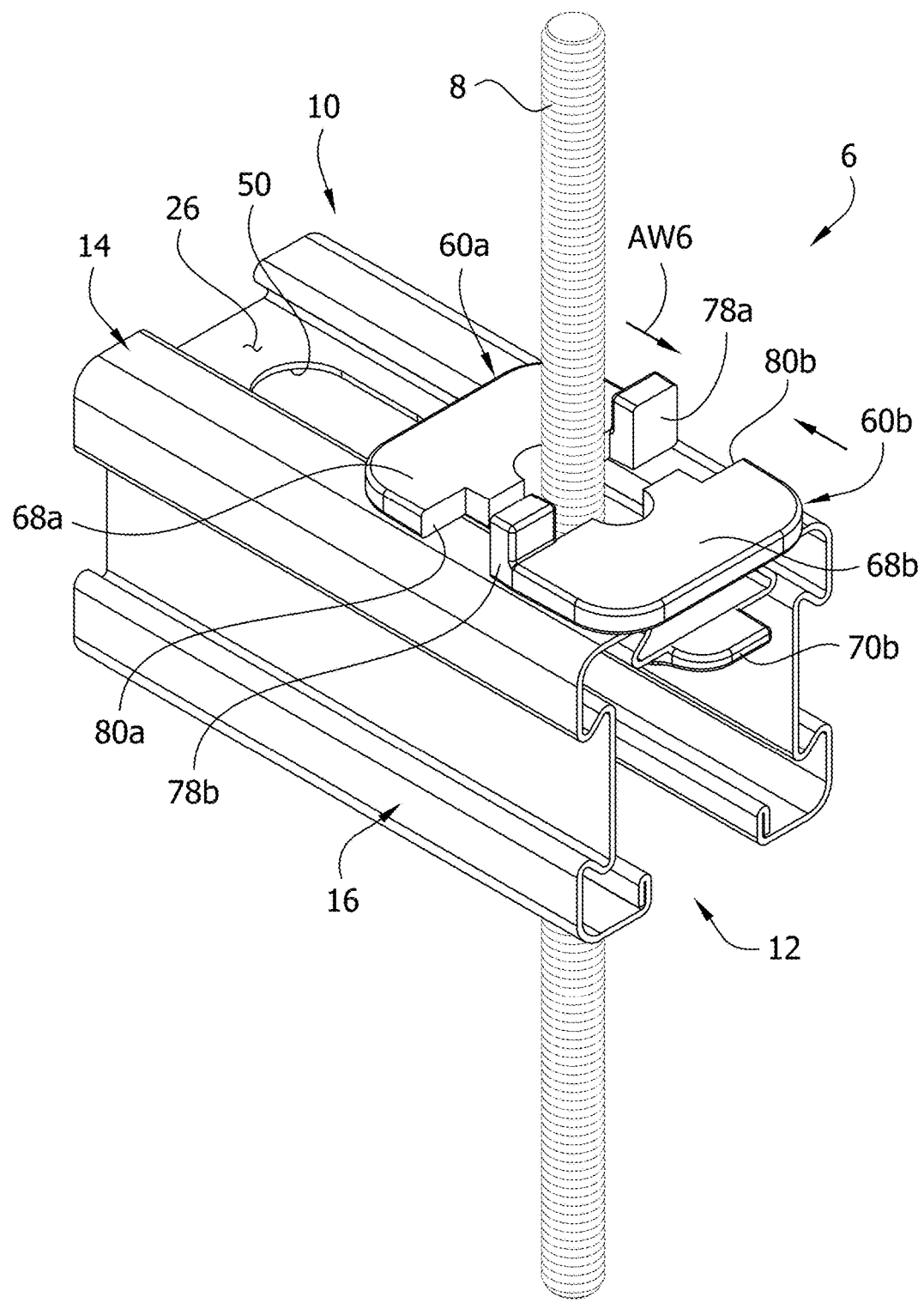
FIG. 18 is similar to FIG. 13 illustrating a sixth step of the exemplary method.
Figure 20:
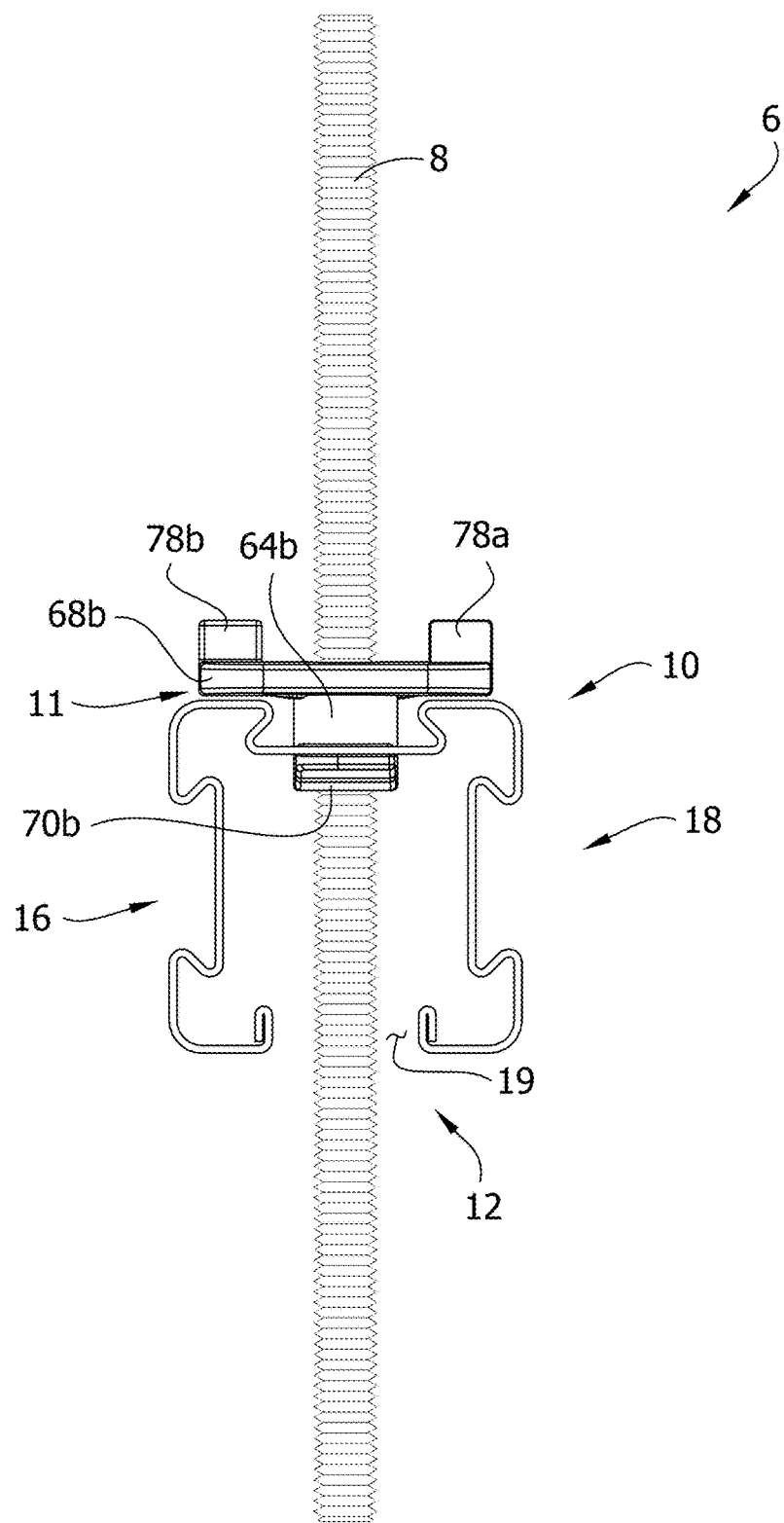
FIG. 20 is a left elevation of FIG. 19.

An exemplary sixth step of the method is shown in FIG. 18. In this exemplary sixth step, the first and second fitting pieces 60a, 60b are moved (e.g., slidably moved) toward one another relative to the rod 8 (e.g., are squeezed toward one another as shown by arrow AW6) so that the internal threads on the arcuate interior surfaces 66a, 66b of the first and second half-nut portions 64a, 64b engage and mate with the thread on the rod 8. In the illustrated embodiment, the half-nut portions 64a, 64b define a full nut that surrounds and mates with substantially 360 degrees of the threaded circumference of the rod. The axes A2, A3 of the half-nut portions 64a, 64b come together and align to define the axis of the full nut portion, which is generally coaxial with the axis of the rod 8. The first and second wing tabs 78a, 78b also enter the respective first and second tab recesses 80a, 80b of the other fitting piece 60a, 60b. As shown in FIG. 20, after completion of the exemplary sixth step, the twist-locking fitting 11 is in an unsecured position on the strut 10 such that the axes of the inner flanges A4 extend axially along the length of the strut 10.

Figure 19:
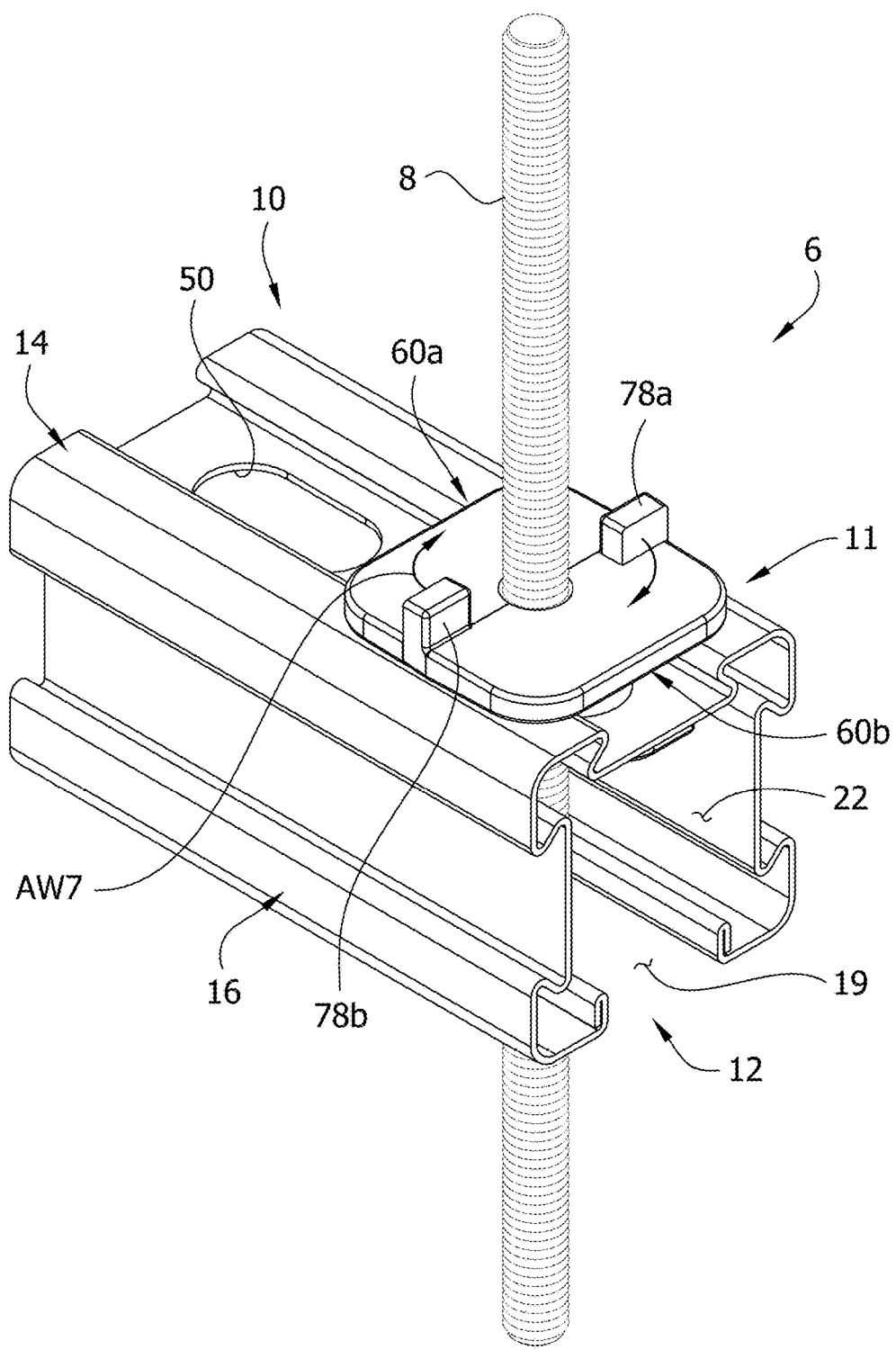
FIG. 19 is similar to FIG. 13 illustrating a partial seventh step of the exemplary method.
Figure 21:
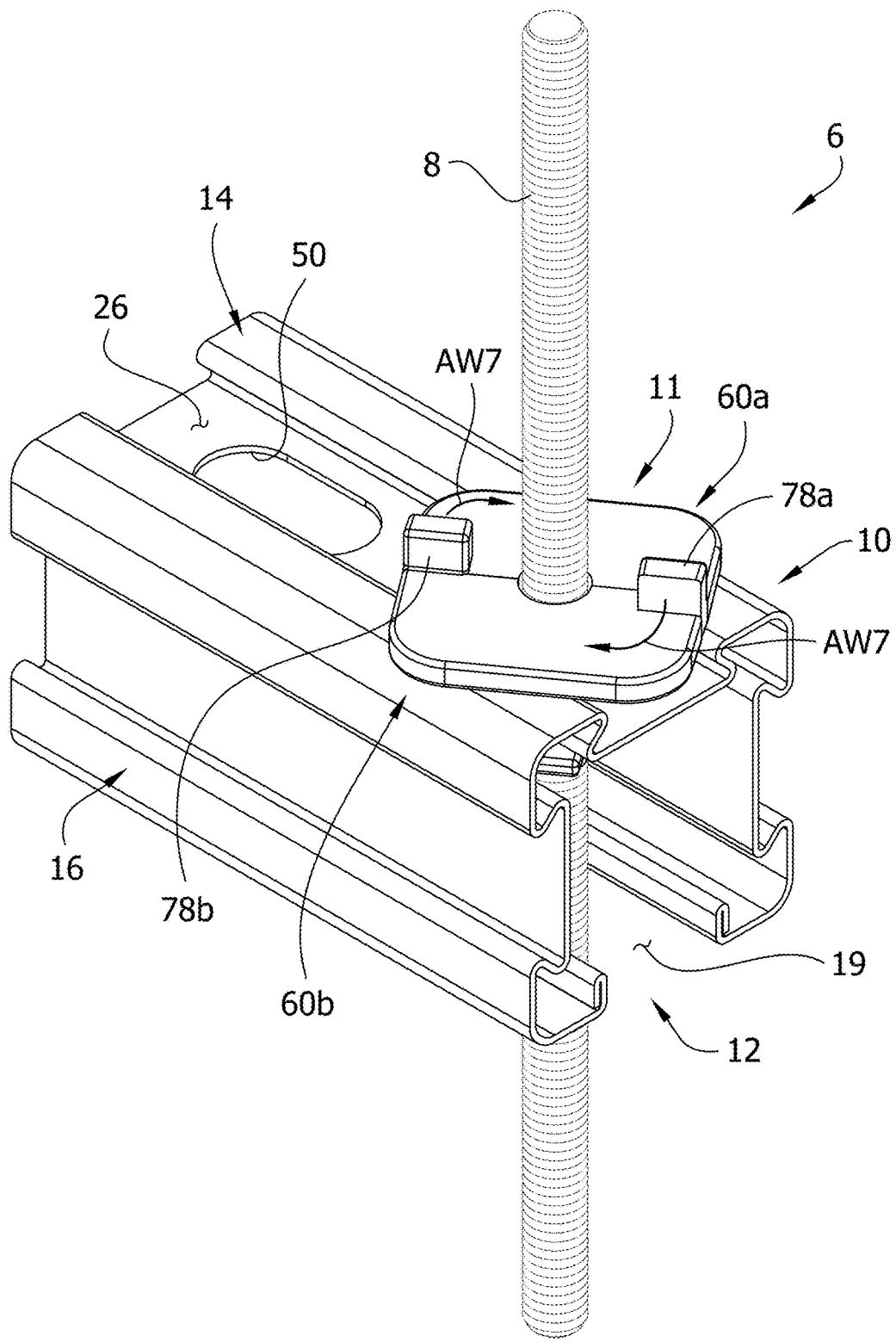
FIG. 21 is similar to FIG. 13 illustrating the remainder of the seventh step of the exemplary method.
Figure 22:
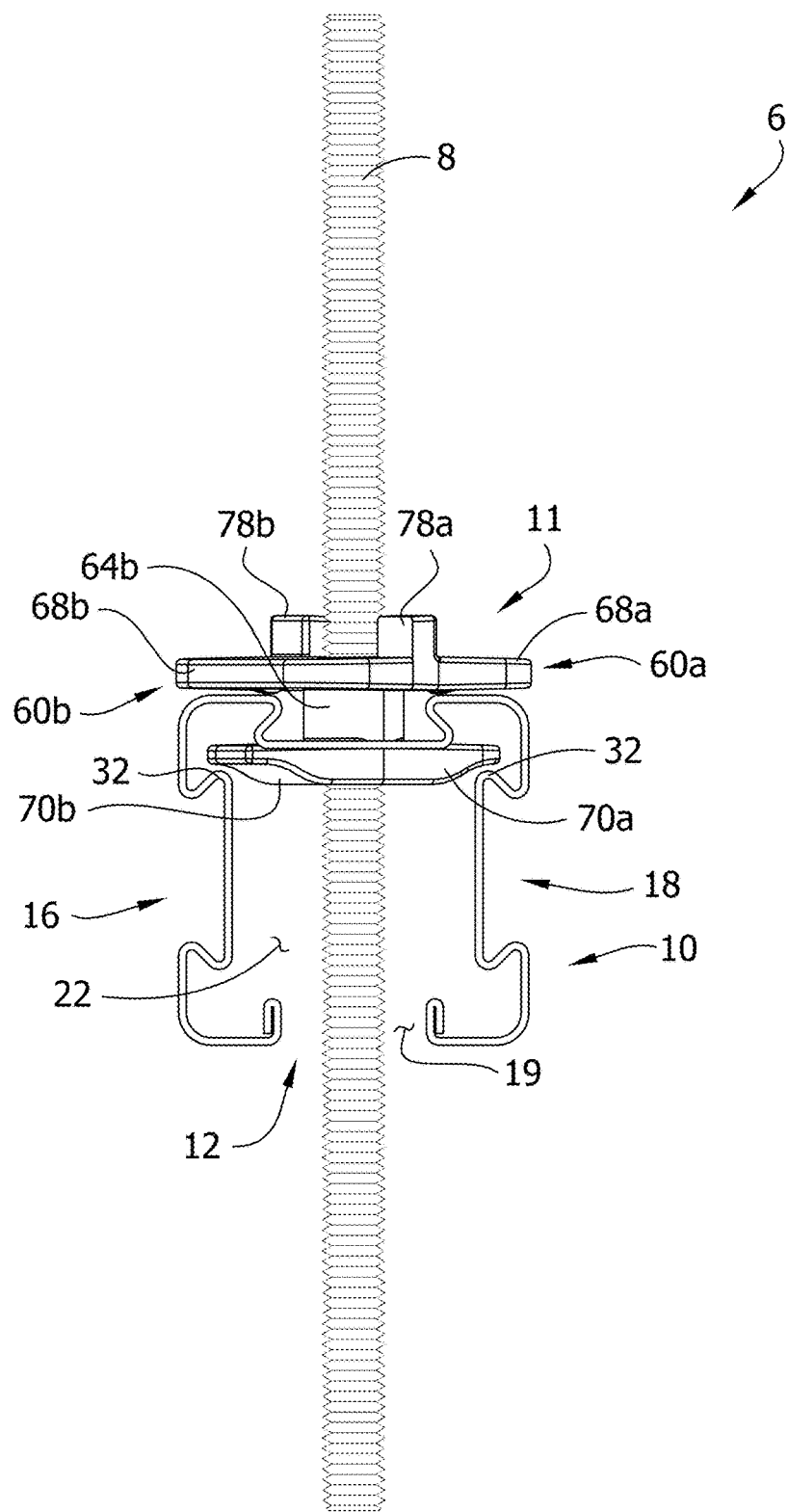
FIG. 22 is a left elevation of FIG. 21.
Figure 23:
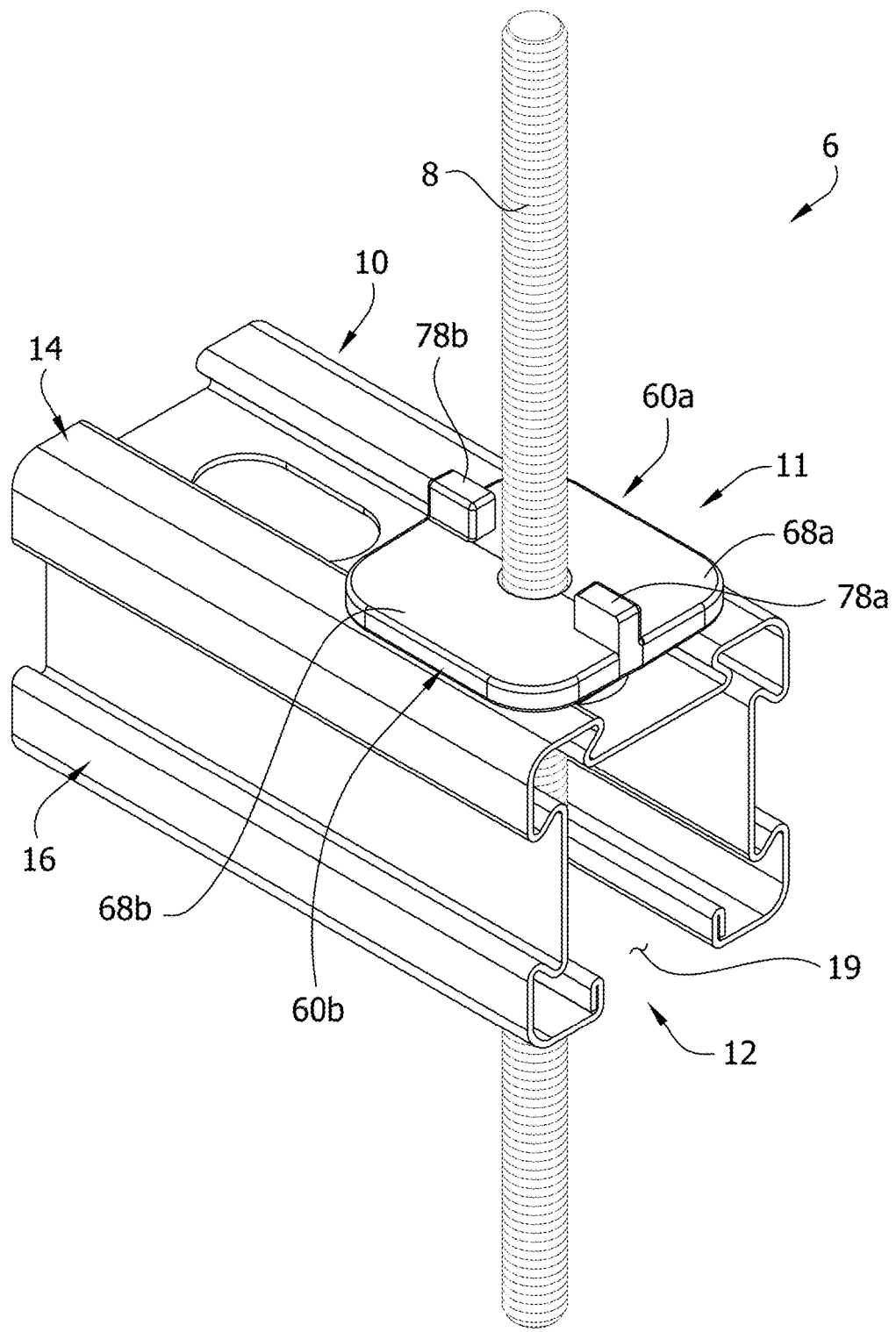
FIG. 23 is similar to FIG. 13 with the twist-locking fitting securing the rod to the strut.

An exemplary seventh step of the method is shown in FIGS. 19 and 21. In this exemplary seventh step, the first and second fitting pieces 60a, 60b are rotated together as a unit (i.e., the fitting 11 is rotated as an assembly) about the rod and relative to the strut 10 in a locking direction (indicated by arrows AW7). In the illustrated embodiment, a user rotates the fitting pieces 60a, 60b as a unit by pinching the first and second wing tabs 78a, 78b between his/her thumb and one or more fingers and then rotating the two fitting pieces together. The wing tabs 78a, 79b received in the tab recesses 80a, 80b aid in keeping the fitting pieces 60a, 60b together and mated with the rod 8 as the fitting 11 is rotated about the rod. As shown in FIG. 22, as fitting pieces 60a, 60b rotate in the locking direction (e.g., in a clockwise direction shown in the figures), the respective inner flanges 70a, 70b move past respective internal shoulders 32 of the left and right internal rails 27 and enter the respective cross-wise portions 42b of the lower T-shaped track 42 (see FIGS. 3 and 4). As shown in FIG. 9, the inner flanges 70a, 70b each include a leading corner 82a, 82b that may be rounded along the axis A4 of the flanges to allow the flanges to enter into the cross-wise portions 42b of the T-shaped track 42. The fitting 11 is rotated about the rod 8 until the axes of the flanges A4 are generally transverse (e.g., generally perpendicular) to the longitudinal axis A of the strut 10. The fitting 11, in this secured position, is shown in cross section in FIG. 12. As shown in FIG. 9, the inner flanges 70a, 70b each include a trailing corner 84a, 84b that is squared along the flange axis A4 to inhibit further rotation beyond its secured position (e.g., rotation past 90 degrees) within the cross-wise portion 42b of the T-shaped track 42. The trailing corner 84b engages the outer portions 24 of the respective sides (e.g., the left and right sides 16, 18 in the illustrated embodiment) partially defining the corresponding T-shaped track 42 when torque is applied to the fitting 11 in the locking direction (e.g., the clockwise direction).

Figure 24:
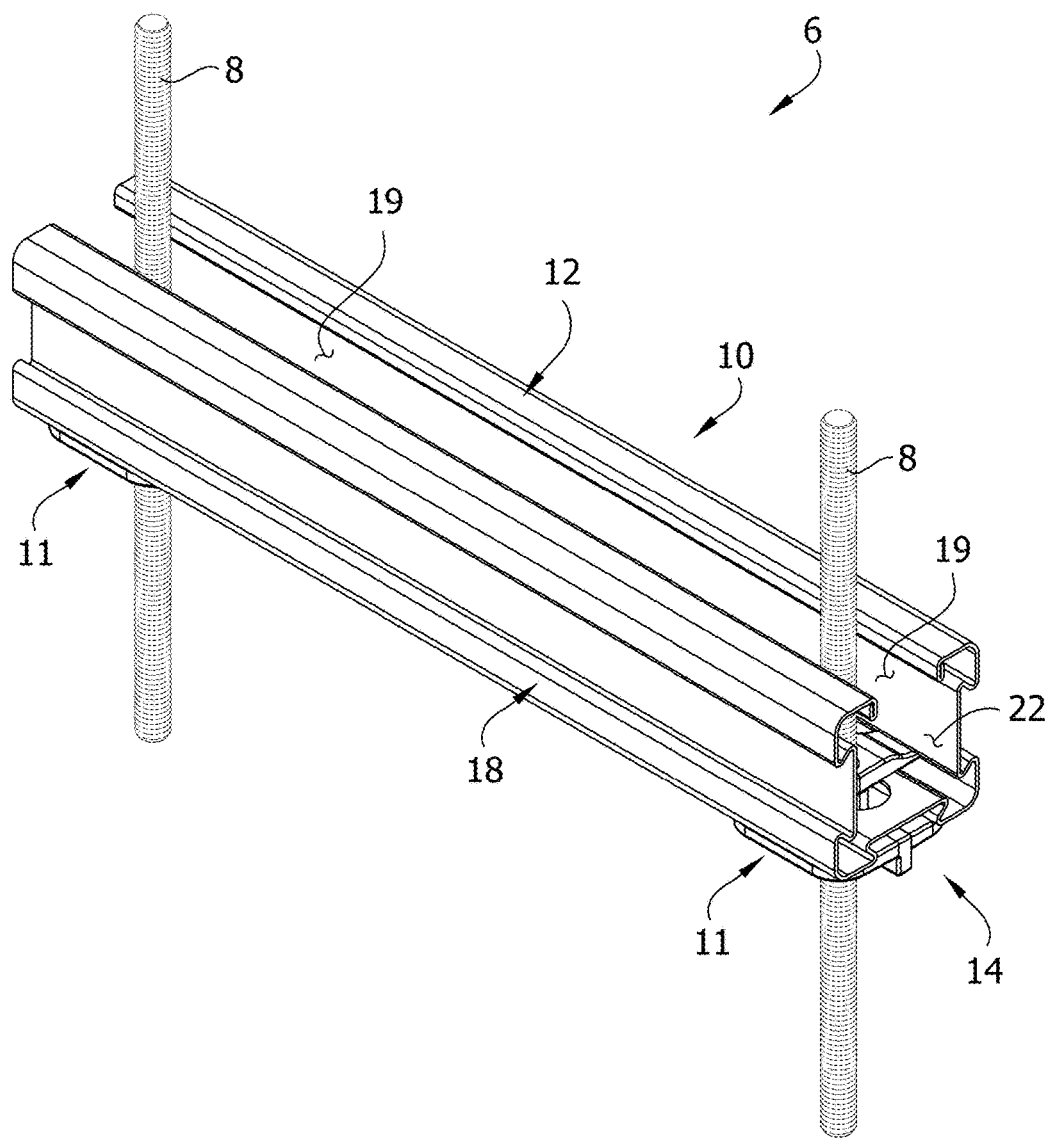
FIG. 24 is a perspective of another embodiment of the an assembled trapeze hanger system, similar to FIG. 1, except the strut is inverted relative to FIG. 1.
Figure 25:
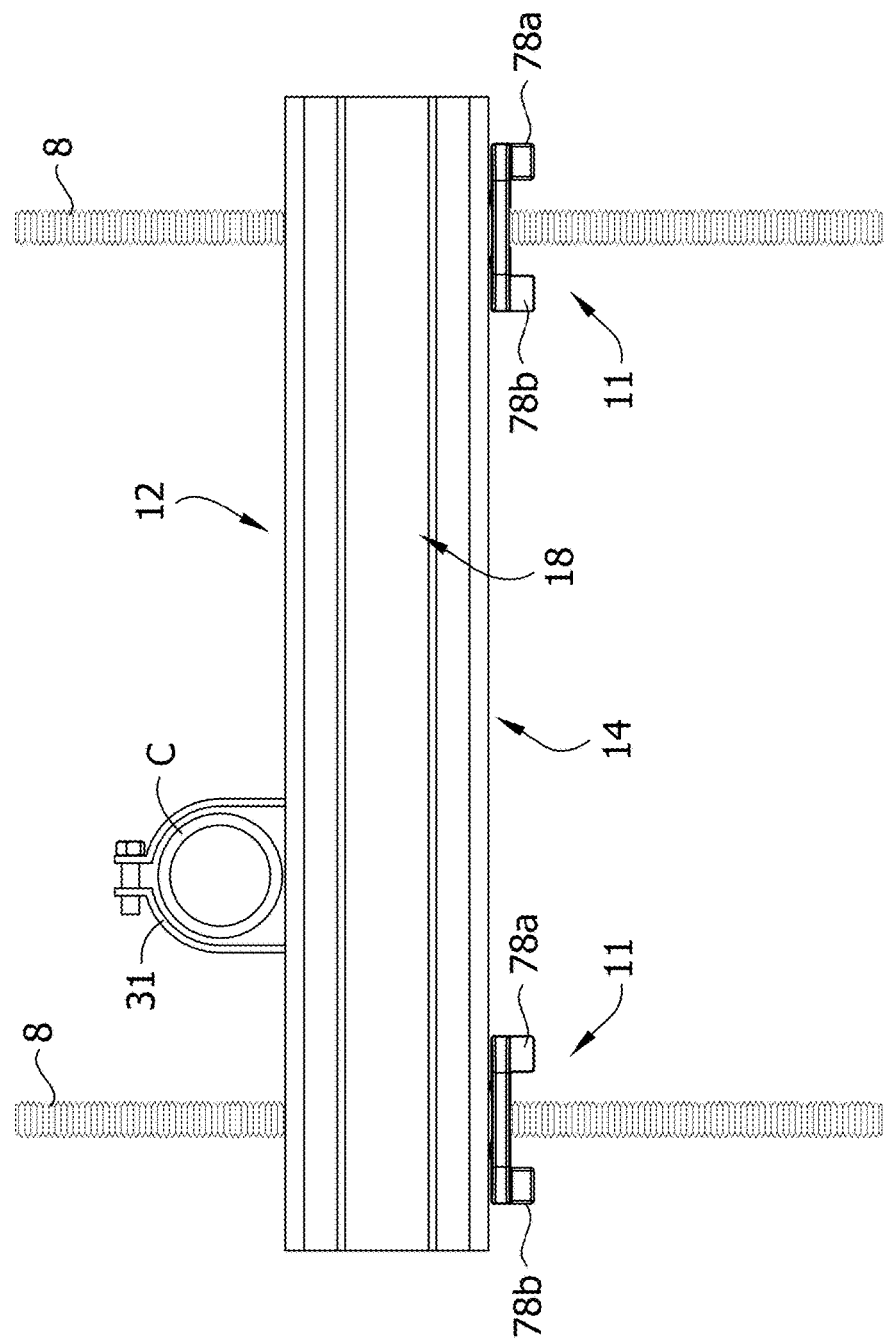
FIG. 25 is an elevation of the assembled trapeze hanger system of FIG. 24, including a component secured thereto.

It is understood that in other embodiments, the strut 10 may be positioned such that the upper side 12 (i.e., the side with the channel 19) is facing upward and the lower side 14 is facing downward. As shown in FIGS. 24 and 25, in this embodiment the fitting 11 is received in the fitting groove 26 of the lower side 14, such as in the above embodiment. The only difference is that the strut 10 is inverted relative to the above-embodiment, and components C are secured to the upper side 12 of the strut 10. It is understood that other components C may be secured to the lower side 14 of the strut 10 in this embodiment.

Figure 26:
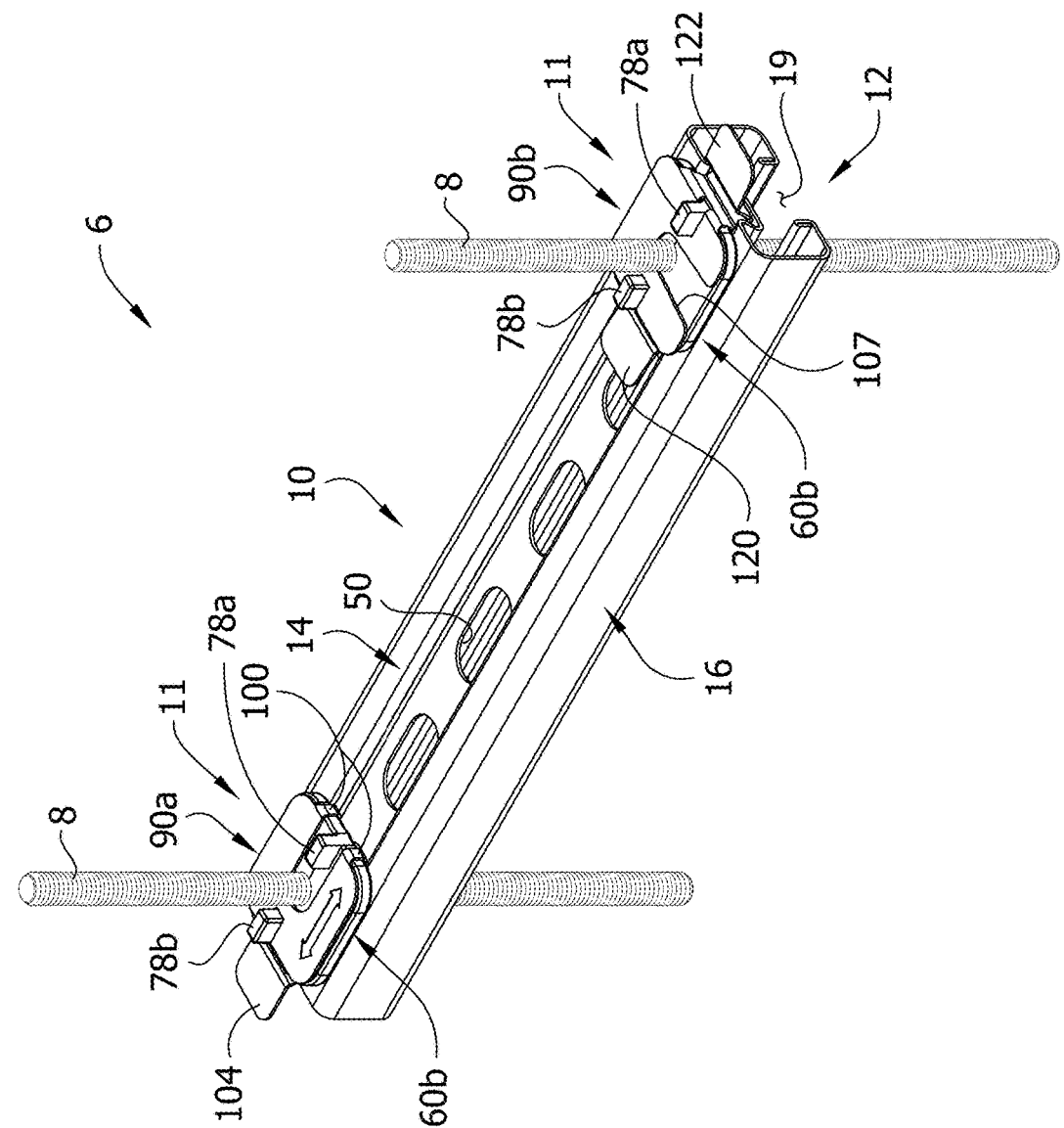
FIG. 26 is a perspective of another embodiment of an assembled trapeze hanger system, similar to FIG. 1, except including a different embodiment of a strut and first and second embodiments of locking components.
Figure 27:
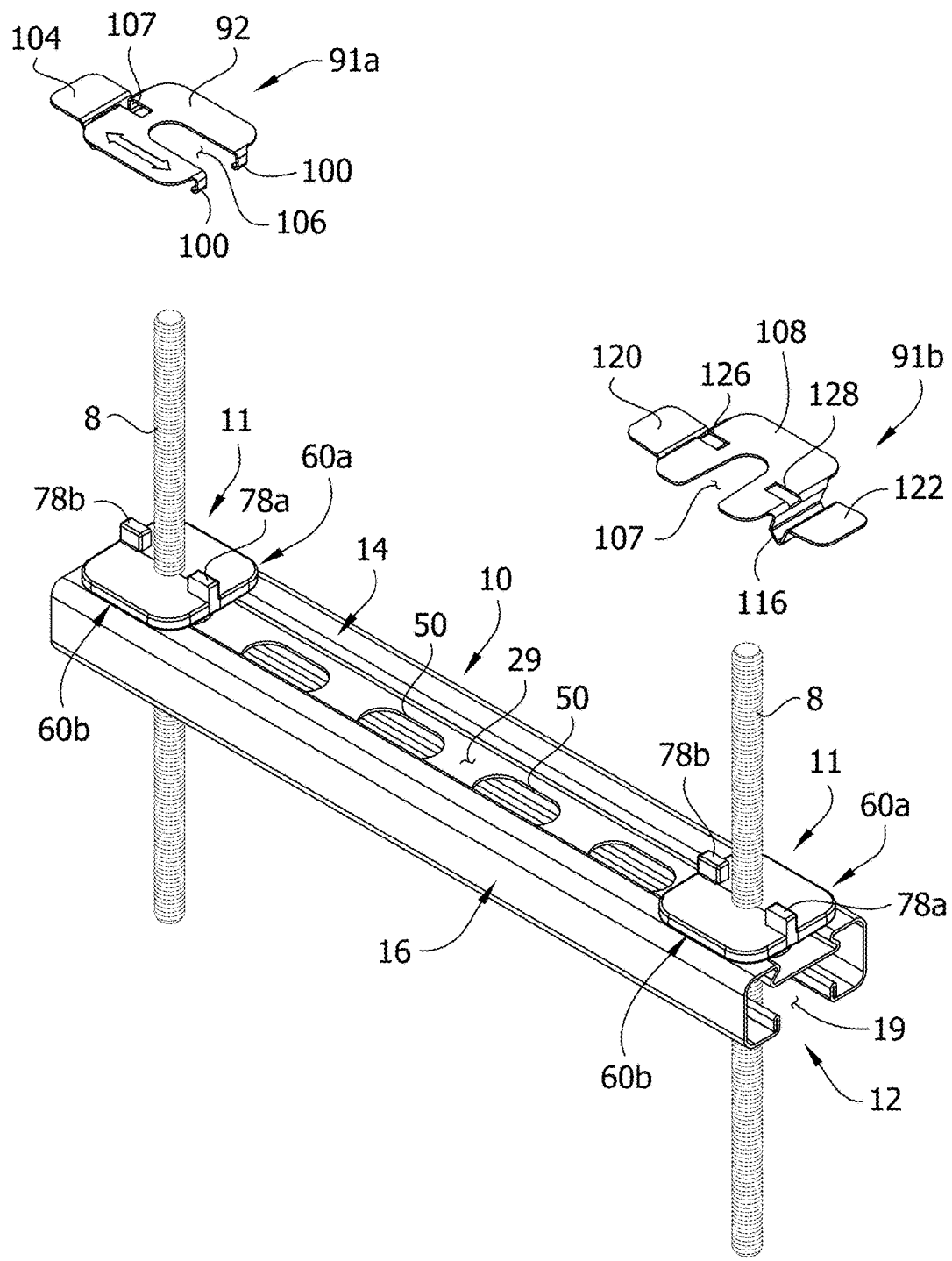
FIG. 27 is similar to FIG. 26, except with the locking components exploded from the twist-locking fittings.
Figure 28:
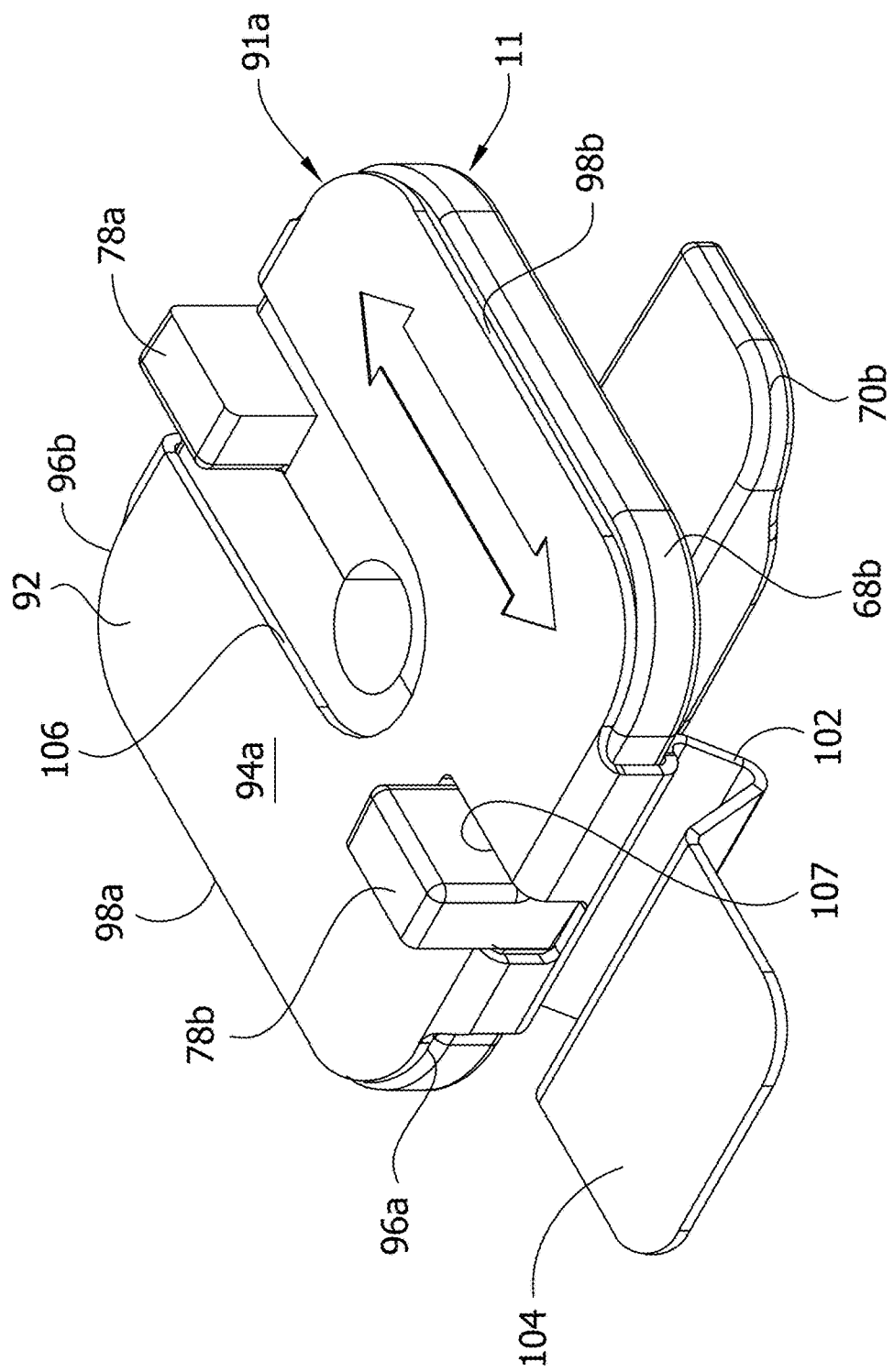
FIG. 28 is a perspective of the first embodiment of the locking component secured to the twist-locking fitting.
Figure 29:
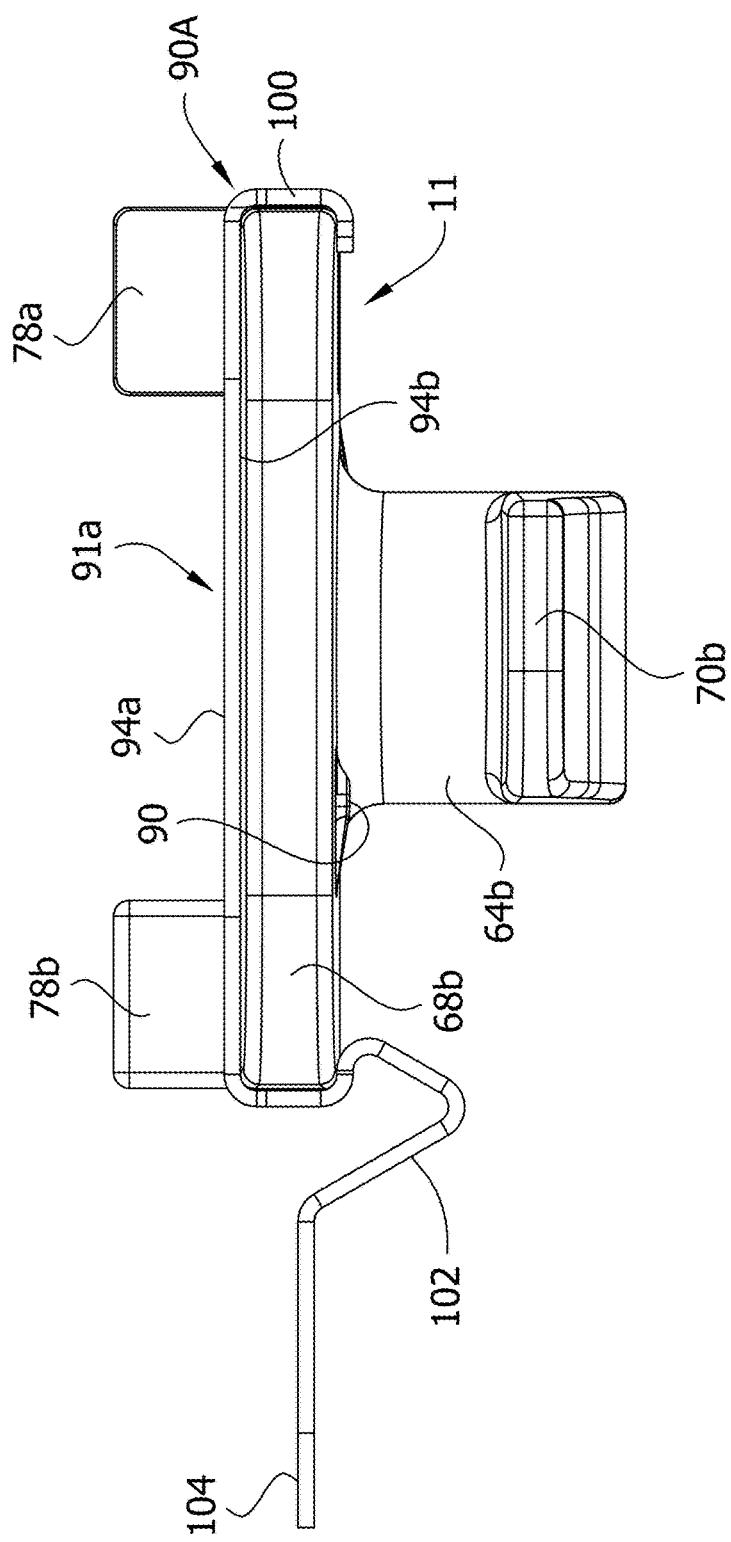
FIG. 29 is an elevation of FIG. 28.
Figure 30:
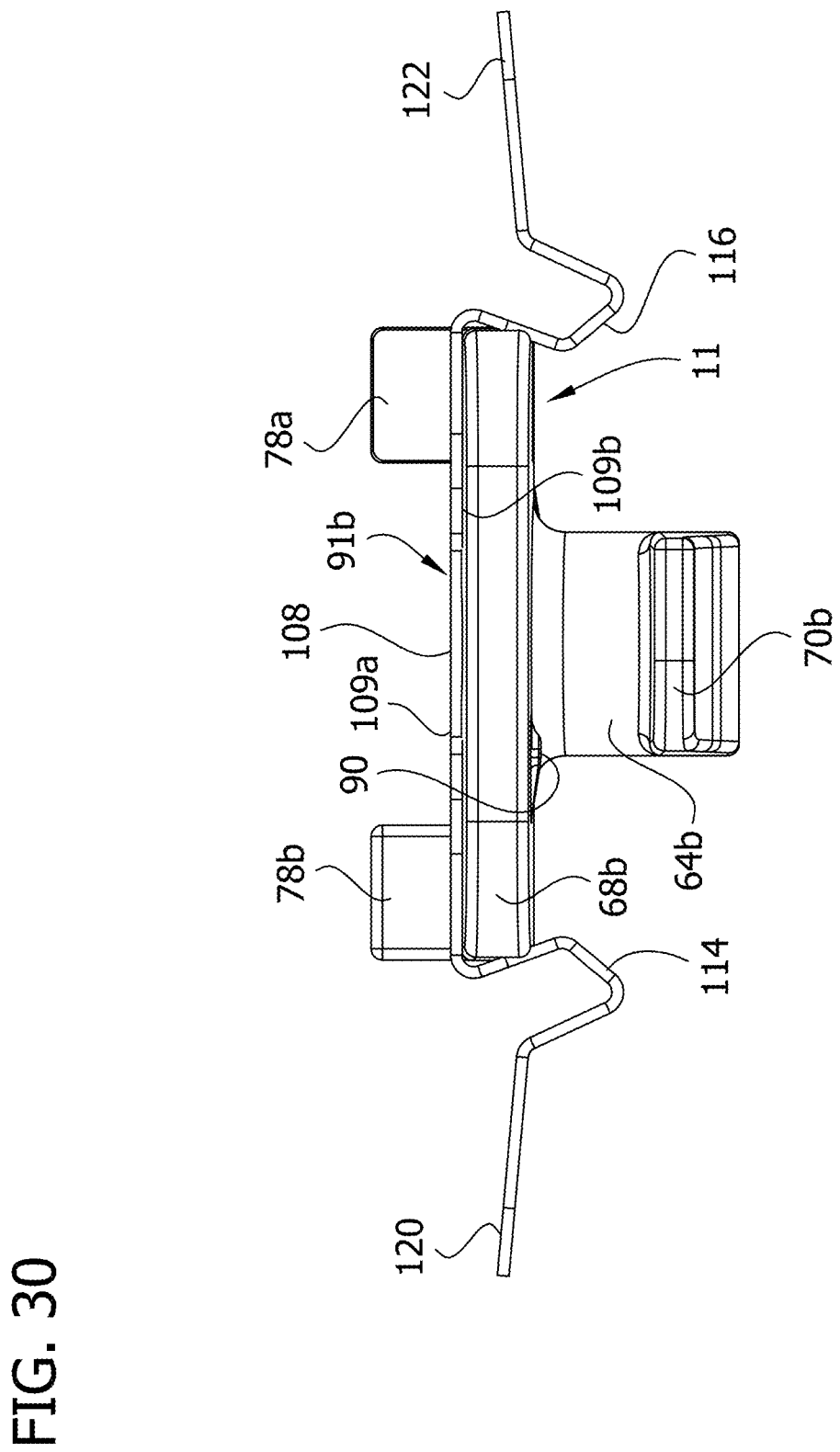
FIG. 30 is an elevation of the second embodiment of the locking component secured to the twist-locking fitting.

It is also understood that the fitting 11 may be secured to the other embodiment of the strut 10, as shown in FIG. 26, in substantially the same manner as the first illustrated embodiment of the strut.

Figure 12:
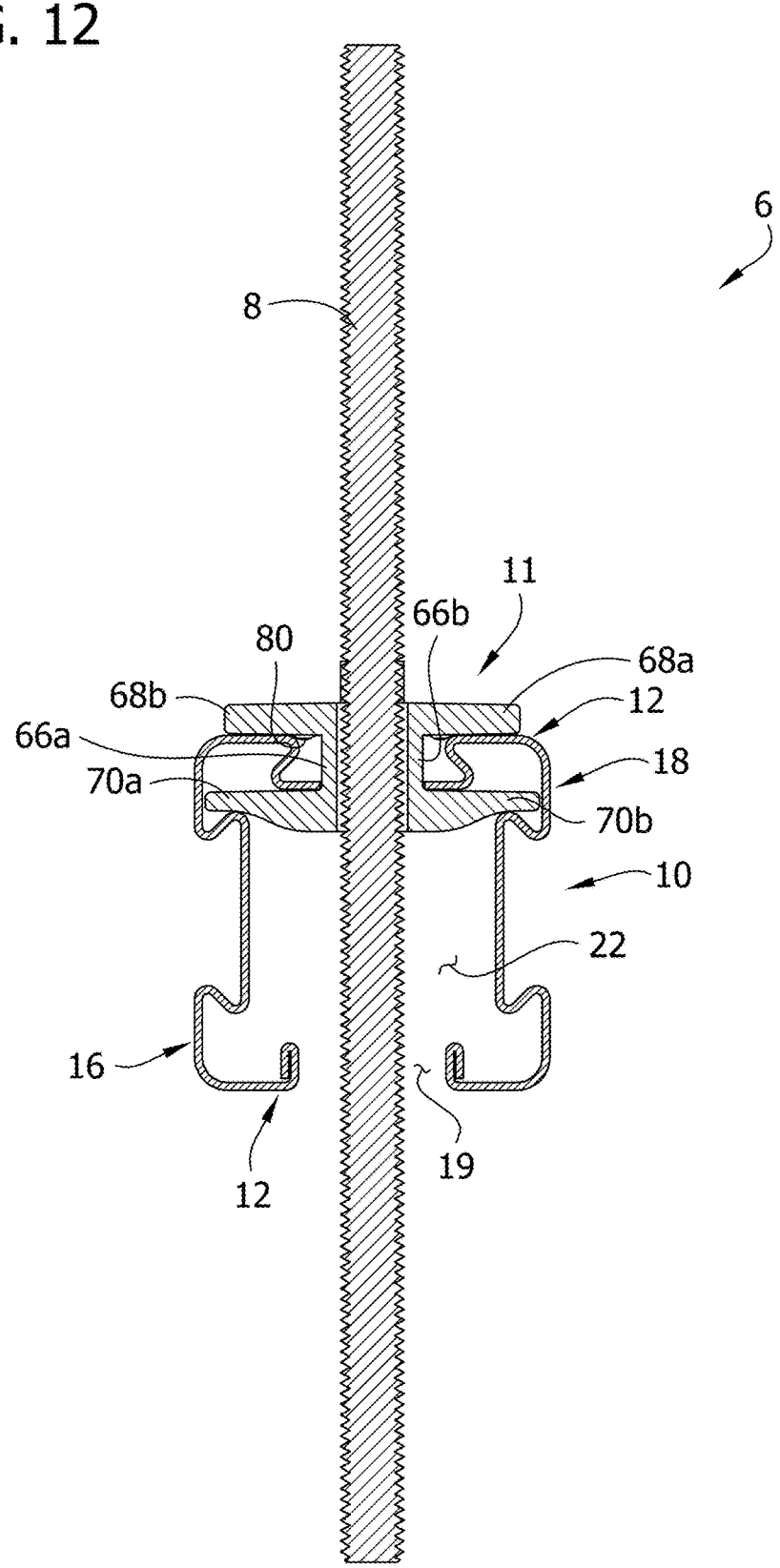
FIG. 12 is a cross section of the assembled trapeze hanger system taken through the plane defined by the line 12-12 in FIG. 11.

The illustrated twist-locking fitting 11 may also include a locking feature, which may be omitted without departing from the scope of the present invention. In the above embodiment (FIGS. 7-9), each of the fitting pieces 60, 60B includes a detent 90 (e.g., a raised bump) projecting outward from an inner surface of the outer flange 68a, 68b and into the corresponding clearance gaps 74a, 74b. The detents 80 are located adjacent to the corresponding half-nut portion 64a, 64b and positioned on the outer flange 68a, 68b such that when the fitting pieces 60a, 60b are in the unlocked position, as shown in FIGS. 19 and 20, the detents are received in the fitting groove 26. As the twist-locking fitting 11 is rotated toward its locked position, the detents 80 engage and ride on the external shoulders 29 of the associated side (e.g., the external shoulders of the lower side 14) and the outer flanges 68a, 68b resiliently deflect. A certain threshold amount of torque applied to the fitting 11 is required to deflect the outer flanges 68a, 68b. In the illustrated embodiment, portions of the detents 90 that engage the external shoulders 29 are gradually sloped to facilitate deflection of the outer flanges 68a, 68b. As the twist-locking fitting 11 continues to be rotated, the detents 90 move along the outer portion 24 of the associated strut side 14 and then enter the fitting groove 26, such as upon the twist-locking fitting being positioned in the locking position, as shown in FIGS. 1 and 12, for example. In this position, the detents 90 engage the adjacent external shoulders 29 if the fitting is rotated in an unlocking direction (e.g., counter-clockwise direction), which is counter to the locking direction. The detent 90 may be configured to ride on the external shoulder 29 to deflect the flanges 68a, 68b when a threshold amount of toque is applied to the fitting 11 in the unlocking direction so that the fitting may be unlocked. This threshold amount of torque for unlocking the fitting 11 may be greater than the threshold amount of torque for locking the fitting. The portions of the detents 90 that engage the external shoulders 29 when the fitting is rotated in the unlocking direction may be sloped less gradually (e.g., have a more abrupt slope) so that it requires more torque for the detents to ride on the external shoulders.

In another embodiment, illustrated in FIGS. 26-30, the twist-locking fitting 11 may include an additional locking component. The locking component inhibits rotation of the fitting when the fitting is in its secured position on the strut. First and second embodiments of this locking component are generally indicated at reference numerals 91a and 91b, respectively. The first locking component 90a (FIGS. 26-29), comprises a plate body 92 having an upper face 94a, a lower face 94b, opposite first and second sides 96a, 96b, and opposite third and fourth sides 98a, 98b. A pair of hooks (each indicated at 100) extends downward from the second side 96B and are configured to hook onto a side the fitting 11 and extend into the fitting groove 26 when the fitting is in the secured position. A clip arm 102 extends downward from the first side 96a and is configured to clip onto the fitting 11 (on a side of the fitting opposite the side engaged by the hooks 100). The clip arm 102 includes a tab 104 to facilitate gripping of the locking component 90a by a user. The first locking component 90a may be formed from a sheet of rigid metal, such as low carbon steel, stainless steel, aluminum, or other metals, or from other material, such as fiberglass or plastic.

To install the locking component 91a on the fitting 11 that is in the secured position, the hooks 100 are attached to (e.g., hooked onto) the fitting. A first slot 106 in the plate body, extending inward from the second side 96b between the hooks 100, provides clearance for the rod 8 and one of the wing tabs (e.g., wing tab 78a) of the fitting 11 such that the rod and wing tab are received in the slot. After hooking the locking component 91a on the fitting 11, the first side 96a is moved (e.g., rotated) toward the fitting 11 about the second side 96b, such as by applying force to the tab 104, such that the clip arm 102 engages the upper surface of the fitting and resiliently deflects outward relative to the plate body 92. As the clip arm 102 continues to pivot downward, a portion of the clip arm enters the fitting groove 26, moves past the lower surface of the fitting and then rebounds toward its initial position, thereby engaging and clipping onto the fitting. A second slot 107 in the plate body, extending inward from the first side 96A provides clearance for the other finger tab of the fitting. The clip arm 102 and the hooks 100 received in the fitting groove 26 inhibit the fitting 11 from rotating, relative to the rod 8 and the strut 10, from its secured position to its unsecured position.

The second locking component 91b comprises a plate body 108 having an upper face 109a, a lower face 109b, opposite first and second sides 110A, 110B, and opposite third and fourth sides 112A, 112B. First and second clip arms 114, 116 extend downward from the corresponding first and second side 110A, 110B of the plate body 106. The clip arms 114, 116 are configured to clip onto the fitting 11 on opposite sides of the fitting. The clip arms 114, 116 include tabs 120, 122 to facilitate gripping of the locking component 91b by a user. The second locking component 91b may be formed from a sheet of rigid metal, such as low carbon steel, stainless steel, aluminum, or other metals, or from other material, such as fiberglass or plastic.

To install the locking component 91b on the fitting 11 that is in the secured position, the clip arms 114, 116 are brought into engagement with the upper surface of the fitting and resiliently deflect outward relative to the plate body 108. Portions of the deflected clip arms 114, 116 move past the lower surface of the fitting 11, enter the fitting groove 26, and rebound toward their initial positions, thereby engaging and clipping onto the fitting. A first slot 126 in the plate body 108, extending inward from the first side 96a, provides clearance for one of the wing tabs (e.g., wing tab 78b) of the fitting 11, and a second slot 128 in the plate, extending inward from the second side 96b, body provides clearance for the other wing tab (e.g., wing tab 78a). A third slot 130, extending inward from the fourth side 98b provides clearance for the rod 8. The clip arms 114, 116 are received in the fitting groove 26 inhibit the fitting 11 from rotating, relative to the rod 8 and the strut 10, from its secured position to its unsecured position.

Having described embodiments of the invention in detail, it will be apparent that modifications and variations are possible without departing from the scope of the invention defined in the appended claims.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A trapeze hanger system comprising:
a strut having a first side having an outer portion and defining at least one opening, and an interior surface defining an open interior; and
a twist-locking fitting configured to secure the strut to a threaded rod, the twist-locking fitting comprising:
a first fitting piece including a first half-nut portion having an interior surface defining a first axis extending through first and second axial ends of the outer half-nut portion, an inner flange extending outward from adjacent the second axial end of the first half-nut portion and configured for reception in the open interior of the strut through the at least one opening of the first side of the strut, an outer flange extending outward from adjacent the first axial end of the first half-nut portion and being spaced axially apart from the inner flange of the first fitting piece such that the outer flange is in opposing relationship with the outer portion of the first side of the strut when the inner flange is received in the open interior of the strut; and
a second fitting piece including a second half-nut portion having an interior surface defining a second axis extending through first and second axial ends of the second half-nut portion, an inner flange extending outward from adjacent the second axial end of the second half-nut portion and configured for reception in the open interior of the strut through the at least one opening of the first side of the strut, an outer flange extending outward from adjacent the first axial end of the second half-nut portion and being spaced axially apart from the inner flange of the second fitting piece such that the outer flange is in opposing relationship with the outer portion of the first side of the strut when the inner flange is received in the open interior of the strut;
wherein the first and second fitting pieces are positionable on the strut in an unsecured position, in which the first and second fitting pieces are movable relative to one another,
wherein the first and second fitting pieces are rotatable relative to the strut to move the first and second fitting pieces from the unsecured position to a secured position on the strut, in which the first and second fitting pieces are fixed relative to one another on the strut.

2. The trapeze hanger system set forth in claim 1, wherein the interior surfaces of the respective first and second half-nut portions include threads.

3. The trapeze hanger system set forth in claim 2, wherein the interior surface of each of the first and second half-nut portions have a circumference subtending 180 degrees relative to the corresponding one of the first and second axes.

4. The trapeze hanger system set forth in claim 3, wherein the thread of the first half-nut portion is offset 180 degrees from the thread of the second half-nut portion to form a continuous thread when the first and second fitting pieces are brought together.

5. The trapeze hanger system set forth in claim 1, wherein the first and second fitting pieces are wholly separable from one another.

6. The trapeze hanger system set forth in claim 1, wherein the first fitting piece further includes a first wing tab extending outward from the outer flange of the first fitting piece.

7. The trapeze hanger system set forth in claim 6, wherein the second fitting piece further includes a second wing tab extending outward from the outer flange of the second fitting piece.

8. The trapeze hanger system set forth in claim 1, wherein each outer flange of the respective first and second fitting pieces has opposite inner and outer surfaces, at least one of the outer flanges of the first and second fitting pieces including a detent projecting outward from the inner surface to inhibit rotation of the first and second fitting pieces from the locked position to the inlocked position.

9. The trapeze hanger system set forth in claim 8, wherein the detent comprises a raised bump configured to engage an outer surface of the strut when the first and second fitting pieces are in the locked position.

10. The trapeze hanger system set forth in claim 9, wherein the detent comprises a first detent of the first fitting pieces and a second detent of the second fitting piece.

11. The trapeze hanger system set forth in claim 1, in combination with the threaded rod, wherein the threaded rod is secured within an opening defined by a combination of the first and second half-nut portions.

12. A method of forming a trapeze hanger system, the method comprising:
inserting inner flanges of respective first and second fitting pieces into an open interior of a strut through an opening extending through a first side of the strut;
inserting a threaded rod between opposing half-nut portions of the first and second fitting pieces;
rotating, after said inserting a threaded rod, the first and second fitting pieces relative to the strut to position the first and second fitting pieces in a secured position, in which the first and second fitting pieces are fixed relative to one another on the strut; and
sliding, after said inserting and before said rotating, the first and second fitting pieces toward one another such that the opposing half-nut portions together define an opening in which the threaded rod is received.

13. The method of forming a trapeze hanger system set forth in claim 12, wherein interior surfaces of the opposing half-nut portions together define the opening, wherein the interior surfaces include threads.

* * * * *